United States Patent
Namegawa et al.

(10) Patent No.: US 11,371,121 B2
(45) Date of Patent: Jun. 28, 2022

(54) NICKEL-CONTAINING STEEL FOR LOW TEMPERATURE

(71) Applicant: NIPPON STEEL CORPORATION, Tokyo (JP)

(72) Inventors: Tetsuya Namegawa, Tokyo (JP); Manabu Hoshino, Tokyo (JP); Shinichi Omiya, Tokyo (JP); Takayuki Kagaya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/757,985

(22) PCT Filed: Oct. 26, 2017

(86) PCT No.: PCT/JP2017/038632
§ 371 (c)(1),
(2) Date: Apr. 21, 2020

(87) PCT Pub. No.: WO2019/082326
PCT Pub. Date: May 2, 2019

(65) Prior Publication Data
US 2020/0291506 A1    Sep. 17, 2020

(51) Int. Cl.
| | |
|---|---|
| C22C 38/00 | (2006.01) |
| C22C 38/02 | (2006.01) |
| C22C 38/04 | (2006.01) |
| C22C 38/06 | (2006.01) |
| C22C 38/44 | (2006.01) |
| C21D 8/02 | (2006.01) |
| C22C 38/42 | (2006.01) |
| C22C 38/46 | (2006.01) |
| C22C 38/48 | (2006.01) |
| C22C 38/50 | (2006.01) |
| C22C 38/54 | (2006.01) |

(52) U.S. Cl.
CPC .......... *C22C 38/001* (2013.01); *C21D 8/0205* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C21D 2211/001* (2013.01)

(58) Field of Classification Search
CPC ....... C22C 38/001; C22C 38/02; C22C 38/04; C22C 38/06; C22C 38/44; C21D 2211/001
USPC ....................................................... 428/544
See application file for complete search history.

(56) References Cited

U.S. PATENT DOCUMENTS

2017/0314092 A1    11/2017   Nakamura et al.

FOREIGN PATENT DOCUMENTS

| | | |
|---|---|---|
| CN | 101864537 A | 10/2010 |
| CN | 102766802 A | 11/2012 |
| EP | 2 460 904 A2 | 6/2012 |
| JP | 56-152920 A | 11/1981 |
| JP | 3-223442 A | 10/1991 |
| JP | 7-109550 A | 4/1995 |
| JP | 8-60237 A | 3/1996 |
| JP | 9-20922 A | 1/1997 |
| JP | 9-41036 A | 2/1997 |
| JP | 9-41088 A | 2/1997 |
| JP | 9-143557 A | 6/1997 |
| JP | 9-256039 A | 9/1997 |
| JP | 2004-339569 A | 12/2004 |
| JP | 2009235492 A * | 10/2009 |
| JP | 2011-21243 A | 2/2011 |
| JP | 2011-219849 A | 11/2011 |
| JP | 2013-213273 A | 10/2013 |
| JP | 2014-34708 A | 2/2014 |
| JP | 2014-210948 A | 11/2014 |
| JP | 5709881 B2 | 4/2015 |
| JP | 2015-86403 A | 5/2015 |
| JP | 2016-44332 A | 4/2016 |
| JP | 2016-176141 A | 10/2016 |
| JP | 2017-8413 A | 1/2017 |
| JP | 2017-115239 A | 6/2017 |
| JP | 2017-160510 A | 9/2017 |
| WO | WO 2016/068009 A1 | 5/2016 |
| WO | WO 2019/082322 A1 | 5/2019 |
| WO | WO 2019/082324 A1 | 5/2019 |
| WO | WO 2019/082325 A1 | 5/2019 |

OTHER PUBLICATIONS

Koseki et al., JP2009235492A machine translation, Oct. 15, 2009, entire translation (Year: 2009).*
"Metallic materials—Tensile testing-Method of test at room temperature", JIS Z 2241: 2011, pp. 477-549.
"Standard Test Method for Measurement of Fracture Toughness", ASTM E1820-13, pp. 1-54.
"Steels—Micrographic determination of the apparent grain size", JIS G 0551, total of 90 pages.

(Continued)

*Primary Examiner* — Humera N. Sheikh
*Assistant Examiner* — Katherine A Christy
(74) *Attorney, Agent, or Firm* — Birch, Stewart, Kolasch & Birch, LLP.

(57) ABSTRACT

A Ni steel has a chemical composition within a predetermined range, in which a metallographic structure of a thickness middle portion contains 2.0 vol % to 20.0 vol % of an austenite phase, an average grain size of prior austenite grains is 3.0 μm to 12.0 μm, an average aspect ratio of the prior austenite grains is 2.6 to 10.0, a plate thickness is 4.5 mm to 20 mm, a yield stress at room temperature is 590 MPa to 710 MPa, and a tensile strength at the room temperature is 690 MPa to 810 MPa, when the plate thickness is more than 16 mm, the Ni steel contains Ni: 11.5% or more, and when the plate thickness is 16 mm or less and the Ni steel contains Ni: less than 11.5%, the average grain size of the prior austenite grains is 6.0 μm or less.

12 Claims, No Drawings

(56) References Cited

OTHER PUBLICATIONS

International Search Report for PCT/JP2017/038615 (PCT/ISA/210) dated Jan. 16, 2018.
International Search Report for PCT/JP2017/038626 (PCT/ISA/210) dated Jan. 23, 2018.
International Search Report for PCT/JP2017/038629 (PCT/ISA/210) dated Jan. 23, 2018.
International Search Report for PCT/JP2017/038632 (PCT/ISA/210) dated Jan. 30, 2018.
Notice of Allowance issued in JP Application No. 2016-087146 dated Oct. 23, 2019.
Notice of Allowance issued in JP Application No. 2016-087147 dated Oct. 23, 2019.
Notice of Allowance issued in JP Application No. 2016-087161 dated Oct. 23, 2019.
Written Opinion of the International Searching Authority for PCT/JP2017/038632 (PCT/ISA/237) dated Jan. 30, 2018.

* cited by examiner

NICKEL-CONTAINING STEEL FOR LOW TEMPERATURE

TECHNICAL FIELD OF THE INVENTION

The present invention relates to a nickel-containing steel for low temperature, that is, a steel containing nickel (Ni) suitable for low temperature at around −253° C.

RELATED ART

In recent years, expectations for the use of liquid hydrogen as clean energy have increased. A steel plate used for a tank that stores and transports a liquefied gas such as liquid hydrogen requires excellent low temperature toughness, and austenitic stainless steel which is less likely to undergo brittle fracture has been used. Although austenitic stainless steel has sufficient low temperature toughness, the yield stress of a general-purpose material at room temperature is about 200 MPa.

In a case where austenitic stainless steel with insufficient strength is applied to a liquid hydrogen tank, there is a limit to the increase in the size of the tank. Furthermore, when the yield stress of the steel is about 200 MPa, the plate thickness thereof needs to exceed 30 mm when the tank is increased in size. Therefore, there are cases where an increase in the weight of the tank and an increase in manufacturing cost are problems. For such problems, for example, an austenitic high Mn stainless steel having a plate thickness of 5 mm and a 0.2% proof stress of 450 MPa or more at room temperature is proposed (for example, refer to Patent Document 1).

Ferritic 9% Ni steel and 7% Ni steel have been used for a tank for a liquefied natural gas (LNG) (sometimes referred to as an LNG tank) which is representative of liquefied gas. Although LNG has a higher temperature than liquid hydrogen, 9% Ni steel and 7% Ni steel have excellent low temperature toughness. Therefore, in the related art, various 9% Ni steels and 7% Ni steels suitable for LNG tanks have been proposed (for example, refer to Patent Documents 2 to 4). 9% Ni steel can also have a yield stress of 590 MPa or more at room temperature, and can also be applied to a large LNG tank.

For example, Patent Document 2 discloses a steel for low temperature with a plate thickness of 25 mm, which contains 5% to 7.5% of Ni, has a yield stress of more than 590 MPa at room temperature, and a brittle fracture surface ratio of 50% or less in a Charpy test at −233° C. In Patent Document 2, the low temperature toughness of the steel for low temperature is secured by setting the volume fraction of residual austenite stable at −196° C. to 2% to 12%.

In addition, Patent Document 3 discloses a steel for low temperature with a plate thickness of 6 mm to 50 mm, which contains 5% to 10% of Ni, has a yield stress of 590 MPa or more at room temperature, and has excellent low temperature toughness at −196° C. after strain aging. In Patent Document 3, the low temperature toughness of the steel for low temperature after strain aging is secured by setting the volume fraction of residual austenite to 3% or more and the effective grain size to 5.5 µm or less, and introducing appropriate defects into the intragranular structure.

Furthermore, Patent Document 4 discloses a thin nickel steel plate for low temperature with a thickness of 6 mm, which contains 7.5% to 12% Ni and is excellent in the low temperature toughness of not only the base metal but also a welded heat-affected zone. In Patent Document 4, the Si and Mn contents are reduced so as not to generate martensite-islands constituents in the welded heat-affected zone, whereby the low temperature toughness of the steel plate at −196° C. is secured.

PRIOR ART DOCUMENT

Patent Document

[Patent Document 1] Japanese Patent No. 5709881
[Patent Document 2] Japanese Unexamined Patent Application, First Publication No. 2014-210948
[Patent Document 3] Japanese Unexamined Patent Application, First Publication No. 2011-219849
[Patent Document 4] Japanese Unexamined Patent Application, First Publication No. H3-223442

DISCLOSURE OF THE INVENTION

Problems to be Solved by the Invention

However, the austenitic high Mn stainless steel disclosed in Patent Document 1 has a larger coefficient of thermal expansion than ferritic 9% Ni steel. For large liquid hydrogen tanks, 9% Ni steel with a low coefficient of thermal expansion is advantageous due to problems such as fatigue. However, as a result of examinations by the present inventors, it was found that it is difficult for the 9% Ni steel and 7% Ni steel disclosed in Patent Documents 2 to 4 to obtain sufficient toughness at −253° C., which is the temperature of liquid hydrogen.

The present invention has been made in view of such circumstances, and an object thereof is to provide a nickel-containing steel for low temperature, which has sufficient toughness at a low temperature of around −253° C., a yield stress of 590 MPa or more at room temperature, and a tensile strength of 690 MPa or more at room temperature.

Means for Solving the Problem

The present inventors conducted numerous examinations on the toughness at a low temperature of around −253° C. and the yield stress and tensile strength at room temperature of a steel having a Ni content higher than 9% in the related art. As a result, it was found that in order to secure low temperature toughness while securing sufficient yield stress and tensile strength at room temperature, it is necessary to limit the Si content, strictly limit the Mn content, and optimally controlling the volume fraction of austenite and the average grain size and average aspect ratio of prior austenite grains.

The present invention has been made based on the above findings, and the gist thereof is as follows.

(1) According to an aspect of the present invention, a nickel-containing steel for low temperature includes, as a chemical composition, by mass %: C: 0.040% to 0.080%; Si: 0.03% to 0.30%; Mn: 0.20% to 0.80%; Ni: 10.5% to 12.4%; Mo: 0.10% to 0.50%; Al: 0.010% to 0.060%; N: 0.0015% to 0.0060%; O: 0.0007% to 0.0030%; Cu: 0% to 0.50%; Cr: 0% to 0.50%; Nb: 0% to 0.020%; V: 0% to 0.080%; Ti: 0% to 0.020%; B: 0% to 0.0020%; Ca: 0% to 0.0040%; REM: 0% to 0.0050%; P: 0.0070% or less; S: 0.0040% or less; and a remainder: Fe and impurities, in which a metallographic structure of a thickness middle portion contains 2.0 vol % to 20.0 vol % of an austenite phase; an average grain size of prior austenite grains measured in a section of the thickness middle portion parallel to a rolling direction and a thickness direction is 3.0 µm to 12.0 µm; an average aspect ratio of the prior austenite grains measured in the section of the thickness middle portion parallel to the rolling direction and the thickness direction is 2.6 to 10.0; a plate thickness is 4.5 mm to 20 mm; a yield stress at room temperature is 590 MPa to 710 MPa; and a tensile strength at the room temperature is 690 MPa to 810 MPa; when the plate thickness is more than 16 mm, the nickel-containing steel contains Ni: 11.5% or more, when the plate thickness is 16 mm or less and the nickel-containing steel contains Ni: less than 11.5%, the nickel-containing steel contains C: 0.070% or less, Si: 0.19% or less, Mn: 0.40% or less, Al: 0.050% or less, N: 0.0050% or less, Cr: 0.35% or less, Nb: 0.015% or less, V: 0.060% or less, Ti: 0.015% or less, P: 0.0050% or less, and S: 0.0030% or less, and the average grain size of the prior austenite grains is 6.0 μm or less.

(2) The nickel-containing steel for low temperature according to (1) may include Ni: 11.5% or more and Mn: 0.50% or less as the chemical composition.

(3) The nickel-containing steel for low temperature according to (1) or (2) may include Ni: 11.5% or more as the chemical composition, in which the average grain size of the prior austenite grains may be 9.0 μm or less.

(4) In the nickel-containing steel for low temperature according to any one of (1) to (3), an average effective grain size measured in the section of the thickness middle portion parallel to the rolling direction and the thickness direction may be 2.0 μm to 7.0 μm.

(5) In the nickel-containing steel for low temperature according to any one of (1) to (3), an average effective grain size measured in the section of the thickness middle portion parallel to the rolling direction and the thickness direction may be 2.0 μm to 4.0 μm.

Effects of the Invention

According to the present invention, it is possible to provide a nickel-containing steel for low temperature having sufficient toughness at a low temperature of around −253° C., a yield stress of 590 MPa or more at room temperature, and a tensile strength of 690 MPa at room temperature. Therefore, when the nickel-containing steel for low temperature of the present invention is used, for example, in a liquid hydrogen tank, the plate thickness of a steel plate for the tank can be made thinner than that of austenitic stainless steel.

With the nickel-containing steel for low temperature according to the present invention, for example, it is possible to achieve an increase in the size and a reduction in the weight of the liquid hydrogen tank, an improvement in heat insulation performance by a reduction in surface area with respect to volume, an effective use of the site where the liquid hydrogen tank is installed, an improvement in the fuel efficiency of a liquid hydrogen carrier, and the like. Furthermore, compared to the austenitic stainless steel, the nickel-containing steel for low temperature according to the present invention has a small coefficient of thermal expansion, so that the design of a large tank is not complex and the tank manufacturing cost can be reduced. As described above, the industrial contribution of the present invention is extremely remarkable.

Embodiments of the Invention

The toughness of a steel for low temperature in the related art (for example, 9% Ni steel) was evaluated at −165° C. or −196° C., but a toughness evaluation temperature for a nickel-containing steel for low temperature (hereinafter, sometimes abbreviated to "Ni steel") according to the present embodiment is significantly lower than the toughness evaluation temperature of the steel in the related art. In addition, for the distinction from temperatures such as −165° C. and −196° C. and concise description, hereinafter, a temperature of around −253° C. is referred to as "extremely low temperature" for convenience.

The present inventors conducted numerous examinations in order to clarify the amounts of elements, a metallographic structure, and the like that affect the toughness of the Ni steel at an extremely low temperature (hereinafter, referred to as "extremely low temperature toughness"). According to the knowledge in the related art, it has been considered effective to increase the Ni content in order to increase low temperature toughness. However, as a result of examinations by the present inventors, it was found that the toughness at an extremely low temperature is not sufficiently improved even if the amount of Ni in 9% Ni steel in the related art is simply changed to increase.

Furthermore, the present inventors examined a method for improving the toughness of Ni steel at an extremely low temperature. As a result, the present inventors found that in order to improve the toughness of Ni steel at an extremely low temperature, in particular, it is necessary to simultaneously satisfy seven conditions including (a) setting the C content to 0.040% to 0.080%, (b) setting the Si content to 0.03% to 0.30%, (c) setting the Mn content to 0.20% to 0.80%, (d) setting the P content to 0.0070% or less, (e) setting the Mo content to 0.10% to 0.50%, (f) controlling the grain size and aspect ratio of prior austenite grains, and (g) controlling the volume fraction of an austenite phase.

Furthermore, the knowledge that the low temperature toughness of the Ni steel at an extremely low temperature is further improved by (h) controlling the effective grain size of the prior austenite grains was also obtained. Moreover, the knowledge that in a case where the plate thickness of the Ni steel is 16 mm or less and the above-described conditions are more strictly limited, the Ni content can be slightly reduced to reduce raw material costs was also obtained.

Next, a Ni steel according to the present embodiment will be described.

In addition, it is necessary to change the Ni content of the Ni steel according to the present embodiment depending on the plate thickness. In a case where the plate thickness is large (that is, the plate thickness is more than 16 mm), the cooling rate during water cooling immediately after rolling becomes slow, and it becomes difficult to secure the low temperature toughness through heat treatments. Therefore, in a case where the plate thickness is more than 16 mm, the amount of Ni, which is an element for securing the low temperature toughness, has to be 11.5% or more.

On the other hand, in a case where the plate thickness is 16 mm or less, it is easy to secure low temperature toughness through heat treatments, so that it is possible to impart sufficient low temperature toughness to the Ni steel while suppressing the Ni content to less than 11.5%. As a matter of course, the Ni steel according to the present embodiment may have a plate thickness of 16 mm or less and a Ni content of 11.5% or more.

However, in a case where the plate thickness is 16 mm or less and the Ni content is less than 11.5% (hereinafter, sometimes described as "in a case where the Ni content is small"), it is necessary to more strictly control elements that affect the low temperature toughness other than the Ni content (the amounts of C, Si, Mn, Al, N, Cr, Nb, V, Ti, P, and S, and the average grain size of prior austenite grains) compared to the case where Ni content is 11.5% or more.

Regarding the requirements that require further limitation depending on the Ni content and the plate thickness due to the above circumstances, the intent thereof will be described as appropriate.

First, the composition of the Ni steel according to the present embodiment will be described. Unless otherwise specified, % in contents means mass %.

(C: 0.040% to 0.080%)

C is an element that increases the yield stress of the Ni steel at room temperature, and also contributes to the formation of martensite and austenite. When the C content is less than 0.040%, the strength of the Ni steel cannot be secured, and the extremely low temperature toughness of the Ni steel may decrease due to the formation of coarse bainite, inclusions, and the like. Therefore, the lower limit of the C content is set to 0.040%. A preferable lower limit of the C content is 0.045%. On the other hand, when the C content exceeds 0.080%, cementite is likely to precipitate at prior austenite grain boundaries, and this cementite causes fracture at the grain boundaries, thereby reducing the extremely low temperature toughness of the Ni steel. Therefore, the upper limit of the C content is set to 0.080%. The upper limit of the C content is preferably 0.070%, more preferably 0.060%, and even more preferably 0.055%.

(In Case Where Ni Content is Small, C: 0.070% or Less)

In a case where the Ni content is small, the C content needs to be 0.070% or less. In a case where the Ni content is small, a preferable upper limit of the C content is 0.065%, 0.060%, or 0.055%. In a case where the Ni content is small, the lower limit and preferable lower limit of the C content may be the same as those of a Ni steel having a Ni content of 11.5% or more.

(Si: 0.03% to 0.30%)

Si is an element that increases the yield stress of the Ni steel at room temperature. When the Si content is less than 0.03%, the effect of improving the yield stress at room temperature is small. Therefore, the lower limit of the Si content is set to 0.03%. A preferable lower limit of the Si content is 0.05%. On the other hand, when the Si content exceeds 0.30%, cementite at the prior austenite grain boundaries is likely to be coarsened, and this cementite causes fracture at the grain boundaries, thereby reducing the extremely low temperature toughness of the Ni steel. Therefore, limiting the upper limit of the Si content to 0.30% is extremely important in order to secure the toughness of the Ni steel at an extremely low temperature. The upper limit of the Si content is preferably 0.20%, more preferably 0.15%, and even more preferably 0.10%.

(In Case Where Ni Content is Small, Si: 0.19% or Less)

In a case where the Ni content is small, the Si content needs to be 0.19% or less. In a case where the Ni content is small, a preferable upper limit of the Si content is 0.16%, 0.13%, or 0.10%. In a case where the Ni content is small, the lower limit and preferable lower limit of the Si content may be the same as those of a Ni steel having a Ni content of 11.5% or more.

(Mn: 0.20% to 0.80%)

Mn is an element that increases the yield stress of the Ni steel at room temperature. When the Mn content is less than 0.20%, the strength of the Ni steel cannot be secured, and the extremely low temperature toughness of the Ni steel may decrease due to the formation of coarse bainite, inclusions, and the like. Therefore, the lower limit of the Mn content is set to 0.20%. A preferable lower limit of the Mn content is 0.25%, or 0.30%. On the other hand, when the Mn content exceeds 0.80%, Mn segregated at the prior austenite grain boundaries and MnS precipitated coarsely cause fractures at the grain boundaries, and the extremely low temperature toughness of the Ni steel decreases. Therefore, limiting the upper limit of the Mn content to 0.80% is extremely important in order to secure the toughness of the Ni steel at an extremely low temperature. The upper limit of the Mn content is preferably 0.70% or 0.60%, and more preferably 0.55% or 0.50%.

(In Case Where Ni Content is Small, Mn: 0.40% or Less)

In a case where the Ni content is small, the Mn content needs to be 0.40% or less. In a case where the Ni content is small, a preferable upper limit of the Mn content is 0.35% or 0.30%. In a case where the Ni content is small, the lower limit and preferable lower limit of the Mn content may be the same as those of a Ni steel having a Ni content of 11.5% or more.

(Ni: 10.5% to 12.4%)

Ni is an essential element for securing the extremely low temperature toughness of the Ni steel. When the Ni content is less than 10.5%, the toughness of the Ni steel at an extremely low temperature is insufficient. Therefore, the lower limit of the Ni content is set to 10.5%. A preferable lower limit of the Ni content is 10.8%, 11.0%, or 11.5%. On the other hand, Ni is an expensive element, and when Ni is contained in more than 12.4%, the economy is impaired. Therefore, the upper limit of the Ni content is limited to 12.4%. The upper limit of the Ni content may be set to 12.2%, 12.0%, or 11.8%. In a case where the plate thickness is 16 mm or less, the upper limit of the Ni content may be set to 11.3%, 11.1%, or 10.9%.

(In Case Where Plate Thickness is More Than 16 nm), Ni: 11.5% or More)

In a case where the plate thickness is more than 16 mm, the Ni content needs to be 11.5% or more. In a case where the plate thickness is more than 16 mm, a preferable lower limit of the Ni content is 11.8% or 12.0%. In a case where the plate thickness is more than 16 mm, the upper limit and preferable upper limit of the Ni content may be the same values as those of a Ni steel having a plate thickness of 16 mm or less.

(Mo: 0.10% to 0.50%)

Mo is an element that increases the yield stress of the Ni steel at room temperature, and also has an effect of suppressing grain boundary embrittlement of the Ni steel. Therefore, the lower limit of the Mo content is set to 0.10%. A preferable lower limit of the Mo content is set to 0.20%. On the other hand, Mo is an expensive element, and when the Mo content exceeds 0.50%, the economy is impaired. Therefore, the upper limit of the Mo content is limited to 0.50%. A preferable upper limit of the Mo content is 0.40%, 0.35%, or 0.30%.

(Al: 0.010% to 0.060%)

Al is an element mainly used for deoxidation. In addition, Al is also an element that forms AlN and contributes to the refinement of the metallographic structure and a reduction in the amount of solute N, which lowers the extremely low temperature toughness of the Ni steel. When the Al content is less than 0.010%, the effect of deoxidation, the effect of the refinement of the metallographic structure, and the effect of reducing the amount of solute N are small. Therefore, the lower limit of the Al content is set to 0.010% or less. The lower limit of the Al content is preferably 0.015%, and more preferably 0.020%. On the other hand, when the Al content exceeds 0.060%, the toughness of the Ni steel at an extremely low temperature decreases. Therefore, the upper limit of the Al content is set to 0.060%. A more preferable upper limit of the Al content is 0.040% or 0.035%.

(In Case Where Ni Content is Small, Al: 0.050% or Less)

In a case where the Ni content is small, the Al content needs to be 0.050% or less. In a case where the Ni content is small, a preferable upper limit of the Al content is 0.040%, 0.030%, or 0.020%. In a case where the Ni content is small, the lower limit and preferable lower limit of the Al content may be the same as those of a Ni steel having a Ni content of 11.5% or more.

(N: 0.0015% to 0.0060%)

N is an element that contributes to the formation of nitrides that refine grains. When the N content is reduced to less than 0.0015%, fine AlN that suppresses the coarsening of the austenite grain size during a heat treatment is insufficient, and there are cases where the austenite grains become coarse and the extremely low temperature toughness of the Ni steel decreases. Therefore, the lower limit of the N content is set to 0.0015%. A preferable N content is 0.0020%. On the other hand, when the N content exceeds 0.0060%, the amount of solute N increases or coarsening of AlN occurs, resulting in the decrease in the toughness of the Ni steel at an extremely low temperature. Therefore, the upper limit of the N content is set to 0.0060%. A more preferable upper limit of the N content is 0.0050%, 0.0040%, or 0.0035%.

(In Case Where Ni Content is Small, N: 0.0050% or Less)

In a case where the Ni content is small, the N content needs to be 0.0050% or less. In a case where the Ni content is small, a preferable upper limit of the N content is 0.0040% or 0.0030%. In a case where the Ni content is small, the lower limit and preferable lower limit of the N content may be the same as those of a Ni steel having a Ni content of 11.5% or more.

(O: 0.0007% to 0.0030%)

O is an impurity, and when the O content exceeds 0.0030%, there are cases where $Al_2O_3$ clusters increase and the toughness of the Ni steel at an extremely low temperature decreases. Therefore, the upper limit of the O content is set to 0.0030%. The upper limit of the O content is preferably 0.0025%, more preferably 0.0020%, and even more preferably 0.0015%. Although it is desirable to reduce the O content as much as possible, there are cases where a reduction in the O content to less than 0.0007% is accompanied by an increase in cost. Therefore, the lower limit of the O content is set to 0.0007%. A preferable lower limit of the O content is 0.0008%, and more preferably 0.0010%.

(P: 0.0070% or Less)

P is an element that causes grain boundary embrittlement at the prior austenite grain boundaries and is thus harmful to the extremely low temperature toughness of the Ni steel. Therefore, it is desirable to reduce the P content as much as possible. When the P content exceeds 0.0070%, there are cases where the toughness of the Ni steel at an extremely low temperature decreases. Therefore, the upper limit of the P content is limited to 0.0070% or less. The upper limit of the P content is preferably 0.0050%, more preferably 0.0040%, and even more preferably 0.0030%. There are cases where P is incorporated into molten steel as an impurity during the manufacturing of the molten steel. However, the lower limit thereof does not need to be particularly limited, and the lower limit thereof is 0%. However, when the P content is reduced to less than 0.0003%, there are cases where the manufacturing cost increases. Therefore, the lower limit of the P content may be set to 0.0003%, 0.0005%, or 0.0010%.

(In Case Where Ni Content is Small, P: 0.0050% or Less)

In a case where the Ni content is small, the P content needs to be 0.0050% or less. In a case where the Ni content is small, a preferable upper limit of the P content is 0.0040% or 0.0030%. In a case where the Ni content is small, the lower limit and preferable lower limit of the P content may be the same as those of a Ni steel having a Ni content of 11.5% or more.

(S: 0.0040% or Less)

S forms MnS, which becomes a brittle fracture origin in some cases, and is thus an element harmful to the extremely low temperature toughness. When the S content exceeds 0.0040%, there are cases where the toughness of the Ni steel at an extremely low temperature decreases. Therefore, the upper limit of the S content is limited to 0.0040% or less. The upper limit of the S content is preferably 0.0030%, more preferably 0.0020%, and even more preferably 0.0010%. There are cases where S is incorporated into molten steel as an impurity during the manufacturing of the molten steel. However, the lower limit thereof does not need to be particularly limited, and the lower limit thereof is 0%. However, when the S content is reduced to less than 0.0002%, there are cases where the melting cost increases. Therefore, the lower limit of the S content may be set to 0.0002%, 0.0004%, or 0.0006%.

(In Case Where Ni Content is Small, S: 0.0030% or Less)

In a case where the Ni content is small, the S content needs to be 0.0030% or less. In a case where the Ni content is small, a preferable upper limit of the S content is 0.0010%, 0.0015%, or 0.0010%. The lower limit and preferable lower limit of the S content of a Ni steel with a small Ni content may be the same as those of a Ni steel having a Ni content of 11.5% or more.

(Cu: 0% to 0.50%)

Cu is an element that increases the yield stress of the Ni steel at room temperature, so that the Ni steel according to the present embodiment may contain Cu. However, when the Cu content exceeds 0.50%, the toughness of the Ni steel at an extremely low temperature decreases. Therefore, the upper limit of the Cu content is set to 0.50%. The upper limit of the Cu content is preferably 0.40%, more preferably 0.30%, and even more preferably 0.20%.

There are cases where Cu is incorporated as an impurity into the Ni steel during the manufacturing of molten steel. However, the lower limit thereof does not need to be particularly limited, and the lower limit thereof is 0%. The lower limit of the Cu content may be set to 0.02%, 0.05%, or 0.10%. The upper and lower limits and preferable upper and lower limits of the Cu content are the above values regardless of the plate thickness and the Ni content.

(Cr: 0% to 0.50%)

Cr is an element that increases the yield stress of the Ni steel at room temperature, so that the Ni steel according to the present embodiment may contain Cr. However, when the Cr content exceeds 0.50%, the toughness of the Ni steel at an extremely low temperature decreases. Therefore, the upper limit of the Cr content is set to 0.50%. The upper limit of the Cr content is preferably 0.30%, more preferably 0.20%, and even more preferably 0.10%.

There are cases where Cr is incorporated as an impurity into the Ni steel during the manufacturing of molten steel. However, the lower limit thereof does not need to be particularly limited, and the lower limit thereof is 0%. The lower limit of the Cr content may be set to 0.02%, 0.05%, or 0.10%.

(In Case Where Ni Content is Small, Cr: 0.35% or Less)

In a case where the Ni content is small, the Cr content needs to be 0.35% or less. In a case where the Ni content is small, a preferable upper limit of the Cr content is 0.30%, 0.25%, or 0.20%. In a case where the Ni content is small, the lower limit and preferable lower limit of the Cr content may be the same as those of a Ni steel having a Ni content of 11.5% or more.

(Nb: 0% to 0.020%)

Nb is an element that increases the yield stress of the Ni steel at room temperature, and also has an effect of improving the extremely low temperature toughness by refining the metallographic structure, so that the Ni steel according to the present embodiment may contain Nb. However, when the Nb content exceeds 0.020%, the toughness of the Ni steel at an extremely low temperature decreases. Therefore, the upper limit of the Nb content is set to 0.020%. The upper limit of the Nb content is preferably 0.015%, and more preferably 0.010%.

There are cases where Nb is incorporated as an impurity into the Ni steel during the manufacturing of molten steel. However, the lower limit thereof does not need to be particularly limited, and the lower limit thereof is 0%. The lower limit of the Nb content may be set to 0.002%, 0.005%, or 0.010%.

(In Case Where Ni Content is Small, Nb: 0.015% or Less)

In a case where the Ni content is small, the Nb content needs to be 0.015% or less. In a case where the Ni content is small, a preferable upper limit of the Nb content is 0.012% or 0.010%. In a case where the Ni content is small, the lower limit and preferable lower limit of the Nb content may be the same as those of a Ni steel having a Ni content of 11.5% or more.

(V: 0% to 0.080%)

V is an element that increases the yield stress of the Ni steel at room temperature, so that the Ni steel according to the present embodiment may contain V. However, when the V content exceeds 0.080%, the toughness of the Ni steel at an extremely low temperature decreases. Therefore, the upper limit of the V content is set to 0.080%. The upper limit of the V content is preferably 0.060%, and more preferably 0.040%.

There are cases where V is incorporated as an impurity into the Ni steel during the manufacturing of molten steel. However, the lower limit thereof does not need to be particularly limited, and the lower limit thereof is 0%. The lower limit of the V content may be set to 0.002%, 0.005%, or 0.010%.

(In Case Where Ni Content is Small, V: 0.060% or Less)

In a case where the Ni content is small, the V content needs to be 0.060% or less. In a case where the Ni content is small, a preferable upper limit of the V content is 0.050% or 0.040%. The lower limit and preferable lower limit of the V content of a Ni steel with a small Ni content may be the same as those of a Ni steel having a Ni content of 11.5% or more.

(Ti: 0% to 0.020%)

Ti forms TiN and contributes to the refinement of the metallographic structure and a reduction in the amount of solute N that lowers the extremely low temperature toughness of the Ni steel, so that the Ni steel according to the present embodiment may contain Ti. However, when the Ti content exceeds 0.020%, the toughness of the Ni steel at an extremely low temperature decreases. Therefore, the upper limit of the Ti content is set to 0.020%. The upper limit of the Ti content is preferably 0.015%, and more preferably 0.010%.

There are cases where Ti is incorporated as an impurity into the Ni steel during the manufacturing of molten steel. However, the lower limit thereof does not need to be particularly limited, and the lower limit thereof is 0%. The lower limit of the Ti content may be set to 0.001%, 0.002%, or 0.005%.

(In Case Where Ni Content is Small, Ti: 0.015% or Less)

In a case where the Ni content is small, the Ti content needs to be 0.015% or less. In a case where the Ni content is small, a preferable upper limit of the Ti content is 0.012% or 0.010%. In a case where the Ni content is small, the lower limit and preferable lower limit of the Ti content may be the same as those of a Ni steel having a Ni content of 11.5% or more.

The upper and lower limits and preferable upper and lower limits of the amounts of B, Ca, REM, Sb, Sn, As, Co, Zn, and W described below are the same regardless of the plate thickness and Ni content.

(B: 0% to 0.0020%)

B is an element that increases the yield stress of the Ni steel at room temperature, and also contributes to a reduction in the amount of solute N, which lowers the extremely low temperature toughness of the Ni steel, by forming BN. Therefore, the Ni steel according to the present embodiment may contain B. However, when the B content exceeds 0.0020%, the toughness of the Ni steel at an extremely low temperature decreases. Therefore, the upper limit of the B content is set to 0.0020%. The upper limit of the B content is preferably 0.0015%, more preferably 0.0012%, and even more preferably 0.0010%.

There are cases where B is incorporated as an impurity into the Ni steel during the manufacturing of molten steel. However, the lower limit thereof does not need to be particularly limited, and the lower limit thereof is 0%. The lower limit of the B content may be set to 0.0001%, 0.0002%, or 0.0005%.

(Ca: 0% to 0.0040%)

Ca is an element that causes MnS, which is an inclusion that tends to be stretched by hot rolling and thus easily increases the harmfulness to the extremely low temperature toughness, to be spheroidized as CaS, and is thus an element effective in improving the extremely low temperature toughness of the Ni steel. Therefore, the Ni steel according to the present embodiment may contain Ca. However, when the Ca content exceeds 0.0040%, oxysulfides containing Ca are coarsened, and these oxysulfides lower the toughness of the Ni steel at an extremely low temperature. Therefore, the upper limit of the Ca content is limited to 0.0040%. The upper limit of the Ca content is preferably set to 0.0030%.

There are cases where Ca is incorporated as an impurity into the Ni steel during the manufacturing of molten steel. However, the lower limit thereof does not need to be particularly limited, and the lower limit thereof is 0%. The lower limit of the Ca content may be set to 0.0005%, 0.0010%, or 0.0015%.

(REM: 0% to 0.0050%)

REM (rare-earth metal element) means a total of 17 elements composed of Sc, Y, and lanthanoids. The REM content means the total amount of these 17 elements. Like Ca, REM causes MnS, which is an inclusion that tends to be stretched by hot rolling and thus easily increases the harmfulness to the extremely low temperature toughness, to be spheroidized as an oxysulfide of REM, thereby being effective in improving the extremely low temperature toughness of the Ni steel. Therefore, the Ni steel according to the present embodiment may contain REM. However, when the REM content exceeds 0.0050%, oxysulfides containing REM are coarsened, and these oxysulfides lower the toughness of the Ni steel at an extremely low temperature.

Therefore, the upper limit of the REM content is limited to 0.0050%. The upper limit of the REM content is preferably set to 0.0040%.

There are cases where REM is incorporated as an impurity into the Ni steel during the manufacturing of molten steel. However, the lower limit thereof does not need to be particularly limited, and the lower limit thereof is 0%. The lower limit of the REM content may be set to 0.0005%, 0.0010%, or 0.0015%.

The Ni steel according to the present embodiment contains or limits the above-mentioned elements, and the remainder consists of iron and impurities. Here, the impurities mean elements that are incorporated due to various factors in the manufacturing process, including raw materials such as ore and scrap, when steel is industrially manufactured, and are allowed in a range in which the Ni steel according to the present embodiment is not adversely affected. However, in the Ni steel according to the present embodiment, it is necessary to define the upper limits of P and S among the impurities as described above.

In addition to the above-mentioned elements, the Ni steel according to the present embodiment may contain the following alloying elements for the purpose of further improving the strength of the steel material itself, the extremely low temperature toughness, and the like, or as impurities from auxiliary raw materials such as scrap. The upper and lower limits and preferable upper and lower limits of the amounts of Sb, Sn, As, Co, Zn, and W described below are the same regardless of the plate thickness and Ni content.

Sb is an element that reduces the extremely low temperature toughness of the Ni steel. Therefore, the Sb content is preferably 0.005% or less, more preferably 0.003% or less, and most preferably 0.001% or less.

Sn is an element that reduces the extremely low temperature toughness of the Ni steel. Therefore, the Sn content is preferably 0.005% or less, more preferably 0.003% or less, and most preferably 0.001% or less.

As is an element that reduces the extremely low temperature toughness of the Ni steel. Therefore, the As content is preferably 0.005% or less, more preferably 0.003% or less, and most preferably 0.001% or less.

Moreover, in order to fully exhibit the effects of the elements, in the Ni steel according to the present embodiment, it is preferable to limit the amount of each of Co, Zn, and W to 0.01% or less or 0.005% or less.

There is no need to limit the lower limits of Sb, Sn, As, Co, Zn, and W, and the lower limit of each of the elements is 0%. Moreover, even if an alloying element (for example, P, S, Cu, Cr, Nb, V, Ti, B, Ca, and REM) with no defined lower limit or with a lower limit of 0% is intentionally added or incorporated as an impurity, when the amount thereof is within the defined range described above, the Ni steel (steel material) is interpreted as the Ni steel according to the present embodiment.

Next, the metallographic structure of the Ni steel according to the present embodiment will be described. In addition, regarding the requirements that require further limitation depending on the Ni content and the plate thickness, the intent thereof will be described as appropriate.

The present inventors newly found that fracture occurs at the prior austenite grain boundaries at an extremely low temperature, and toughness is likely to decrease. The Ni steel according to the present embodiment is manufactured by performing hot rolling, water cooling, and thereafter heat treatments including an intermediate heat treatment and tempering. In the Ni steel according to the present embodiment, the prior austenite grain boundaries are grain boundaries of austenite that have existed mainly after hot rolling and before the start of water cooling. A large proportion of the prior austenite grain boundaries that have existed after the hot rolling and before the start of the water cooling are coarse. It is considered that Mn, P, and Si are segregated at the coarse prior austenite grain boundaries, and these elements lower the bonding force of the prior austenite grain boundaries and impair the toughness of the Ni steel at an extremely low temperature.

Although prior austenite grain boundaries are newly generated during the intermediate heat treatment, since the temperature of the intermediate heat treatment of the Ni steel according to the present embodiment is as low as 610° C. to 650° C., there are very few coarse austenite grains newly generated during the intermediate heat treatment. The amount of Mn, P, and Si that segregates to the new prior austenite grain boundaries that are not coarse is smaller than the amount thereof diffused during the hot rolling. For this reason, it is considered that fracture from the prior austenite grain boundaries (most of which are prior austenite grain boundaries generated during the intermediate heat treatment) which are not coarse among the prior austenite grain boundaries is relatively unlikely to occur.

In a case of measuring the grain size and aspect ratio of the prior austenite grains, only coarse prior austenite grains are measured. In the present embodiment, whether or not the prior austenite grain boundaries are coarse is determined based on whether or not the grain size of the prior austenite grains is 2.0 µm or more. That is, the prior austenite grains having a grain size of less than 2.0 µm are determined to be prior austenite grains that do not impair the low temperature toughness of the Ni steel, and the average grain size and average aspect ratio of the prior austenite grains are measured excluding the prior austenite grains having a grain size of less than 2.0 µm. By this method, the average grain size and average aspect ratio of the prior austenite grains are obtained. In the Ni steel according to the present embodiment, the "average grain size of the prior austenite grains" means the average value of the grain sizes of prior austenite grains having a grain size of 2.0 µm or more, and the "average aspect ratio of the prior austenite grains" means the average value of the aspect ratios of prior austenite grains having a grain size of 2.0 µm or more.

The present inventors conducted numerous examinations on methods for suppressing fracture at the prior austenite grain boundaries at an extremely low temperature. As a result, the present inventors found that in order to improve the toughness of the Ni steel at an extremely low temperature, it is necessary to simultaneously satisfy seven conditions including (A) setting the C content to 0.040% to 0.080% (here, corresponding to a case where the Ni content is 11.5% or more, and the same applies to (B) to (G)), (B) setting the Si content to 0.03% to 0.30%, (C) setting the Mn content to 0.20% to 0.80%, (D) setting the P content to 0.0070% or less, (E) setting the Mo content to 0.10% or more and 0.50% or less, (F) controlling the grain size and aspect ratio of prior austenite grains, and (G) controlling the volume fraction of an austenite phase. Moreover, the present inventors also obtained the knowledge that in a case where the plate thickness of the Ni steel is 16 mm or less and the above-described conditions are more strictly limited, sufficient extremely low temperature toughness can be imparted to the Ni steel even when the Ni content is less than 11.5%, and the Ni content can be reduced to reduce raw material costs.

It is presumed that at an extremely low temperature, fracture is likely to occur in a portion where the bonding force is relatively weak, such as a coarse prior austenite grain boundary. Therefore, it is considered that the decrease in the bonding force of the prior austenite grain boundaries can be suppressed by suppressing precipitation of cementite and segregation of Mn and P that weakens the bonding force of the coarse prior austenite grain boundaries. Moreover, an increase in the C content and the Si content and coarsening of the prior austenite grains promote the coarsening of intergranular cementite. Therefore, in order to improve the toughness of the Ni steel at an extremely low temperature, it is necessary to suppress the C content and the Si content and to refine the prior austenite grains.

(Average Grain Size of Prior Austenite Grains Measured in Section of Thickness Middle Portion Parallel to Rolling Direction and Thickness Direction: 3.0 to 12.0 μm)

The average grain size of the prior austenite grains measured in a section of a thickness middle portion parallel to a rolling direction and a thickness direction needs to be 3.0 to 12.0 μm. In the present embodiment, unless otherwise specified, the average grain size of the prior austenite grains indicates an average grain size measured in the section of the thickness middle portion parallel to the rolling direction and the thickness direction. When the average grain size of the prior austenite grains is more than 12.0 μm, coarse cementite precipitates at the prior austenite grain boundaries. In addition, when the average grain size of the prior austenite grains is more than 12.0 μm, the concentration of Mn and P at the grain boundaries increases.

Precipitation of coarse cementite at the prior austenite grain boundaries and concentration of Mn and P weaken the bonding force of the prior austenite grain boundaries and cause fractures at the prior austenite grain boundaries in some cases. In addition, there are cases where points where coarse cementite precipitates at the prior austenite grain boundaries and points where Mn and P are concentrated become brittle fracture origins. As described above, an increase in the average grain size of the prior austenite grains decreases the extremely low temperature toughness of the Ni steel. Therefore, the upper limit of the average grain size of the prior austenite grains is set to 12.0 μm. The upper limit of the average grain size of the prior austenite grains may be set to 10.0 μm, 9.0 μm, 8.0 μm, 7.0 μm, or 6.0 μm.

In order to refine the average grain size of the prior austenite grains to less than 3.0 μm, methods accompanied by an increase in manufacturing cost such as an increase in the number of heat treatments are necessary. Therefore, the lower limit of the average grain size of the prior austenite grains is set to 3.0 μm. The lower limit of the average grain size of the prior austenite grains may be set to 3.5 μm, 4.0 μm, or 5.0 μm.

(In Case Where Ni Content is Small, Average Grain Size of Prior Austenite Grains: 6.0 μm or Less)

In a case where the Ni content is small, the average grain size of the prior austenite grains needs to be 6.0 μm or less. The upper limit thereof may be set to 5.5 μm or 4.0 μm as necessary. In a case where the Ni content is small, the lower limit and preferable lower limit of the average grain size of the prior austenite grains may be the same as those of a Ni steel having a Ni content of 11.5% or more.

(Average Aspect Ratio of Prior Austenite Grains Measured in Section of Thickness Middle Portion Parallel to Rolling Direction and Thickness Direction: 2.6 to 10.0)

In the present embodiment, when a manufacturing method described later is applied to a steel having the above-described chemical composition, the average aspect ratio of austenite grains measured in a section of a thickness middle portion parallel to a rolling direction and a thickness direction becomes 2.6 to 10.0.

In the present embodiment, unless otherwise specified, the average aspect ratio of the prior austenite grains indicates an average aspect ratio measured in the section of the thickness middle portion parallel to the rolling direction and the thickness direction. The average aspect ratio of the prior austenite grains is the ratio between the length and thickness of the prior austenite grains in the section (L-section) parallel to the rolling direction and the thickness direction, that is, the length of the prior austenite grains in the rolling direction/the thickness of the prior austenite grains in the thickness direction.

When the average aspect ratio of the prior austenite grains is more than 10.0, the prior austenite grain size is more than 12.0 μm due to excessive rolling in a non-recrystallization region, and the extremely low temperature toughness of the Ni steel decreases. In addition, cementite tends to coarsen at the prior austenite grain boundaries along the rolling direction. When coarse cementite precipitates at the prior austenite grain boundaries, stress exerted on the prior austenite grain boundaries increases, and fracture is likely to occur at the prior austenite grain boundaries. Therefore, the upper limit of the average aspect ratio of the prior austenite grains is set to 10.0. The upper limit of the average aspect ratio of the prior austenite grains may be set to 9.0 or 8.0. The lower limit thereof may be set to 2.8, 3.2, 3.6, 4.1, 4.6, or 5.1. The upper and lower limits and preferable upper and lower limits of the average aspect ratio of the prior austenite grains are the above values regardless of the plate thickness and the Ni content.

The average grain size and the average aspect ratio of the prior austenite are measured using the section (L-section) of the thickness middle portion parallel to the rolling direction and the thickness direction as an observed section.

The prior austenite grain boundaries are revealed by corroding the observed section with a saturated aqueous solution of picric acid. An enlarged photograph of the thickness middle portion of the L-section subjected to the corrosion treatment is photographed at five or more visual fields with a scanning electron microscope (SEM) at a magnification of 1,000-fold or 2,000-fold. The circle equivalent grain sizes (diameters) of at least 20 prior austenite grains having a circle equivalent diameter (diameter) of 2.0 μm or more, which are included in these SEM photographs, are obtained by image processing, and the average value thereof is calculated, thereby obtaining the average grain size of the prior austenite grains measured in the section of the thickness middle portion parallel to the rolling direction and the thickness direction. In a case where prior austenite grains having a grain size of less than 2.0 μm are included, the above-described measurement is performed excluding the prior austenite grains.

In addition, the ratios (aspect ratios) between the length in the rolling direction and the thickness in the thickness direction of at least 20 prior austenite grains having a circle equivalent diameter (diameter) of 2.0 μm or more, which are included in the above SEM photographs, are measured. The average value of the obtained aspect ratios which are measured is calculated, thereby obtaining the average aspect ratio of the prior austenite measured in the section of the thickness middle portion parallel to the rolling direction and the thickness direction.

(Volume Fraction of Austenite Phase in Metallographic Structure of Thickness Middle Portion: 2.0 vol % to 20.0 vol %)

In the Ni steel according to the present embodiment, in order to increase the toughness at an extremely low temperature, the metallographic structure of the thickness middle portion of the Ni steel at room temperature contains 2.0 vol % or more of an austenite phase. In the present embodiment, unless otherwise specified, the volume fraction of the austenite phase indicates a volume fraction measured at the thickness middle portion. This austenite phase is different from prior austenite and is an austenite phase present in a Ni steel after tempering. The volume fraction of the austenite phase is measured by X-ray diffraction method.

In a case where 2.0 vol % to 20.0 vol % of the austenite phase is contained in the thickness middle portion of the Ni steel at room temperature, it is considered that a stable austenite phase is present in the Ni steel in an amount that is necessary for securing the toughness at an extremely low temperature even when cooled to an extremely low temperature. It is considered that in a case where an austenite phase which is stable even at an extremely low temperature is present, applied stress and strain are relieved by the plastic deformation of austenite, and thus the toughness of the Ni steel is improved. In addition, the austenite phase is relatively uniformly and finely generated at the prior austenite grain boundaries, the block boundaries and lath boundaries of tempered martensite, and the like. That is, it is considered that since the austenite phase is present in the vicinity of a hard phase, which is a phase that is likely to be a brittle fracture origin, the austenite phase relieves the concentration of stress or strain around the hard phase and thus contributes to the suppression of the occurrence of brittle fracture.

It is considered that as a result of generating 2.0 vol % or more of the austenite phase in the thickness middle portion, coarse cementite, which becomes a brittle fracture origin, can be significantly reduced. Therefore, the lower limit of the volume fraction of the austenite phase in the metallographic structure of the thickness middle portion is set to 2.0 vol %. The lower limit of the volume fraction of the austenite phase in the metallographic structure of the thickness middle portion may be set to 3.0 vol % or 4.0 vol %.

On the other hand, when the volume fraction of the austenite phase is more than 20.0 vol %, the concentration of C or the like into the austenite phase becomes insufficient, and the possibility of transformation of the austenite phase into martensite at an extremely low temperature increases. There are cases where an unstable austenite phase that transforms into martensite at an extremely low temperature reduces the extremely low temperature toughness of the Ni steel. Therefore, the upper limit of the volume fraction of the austenite phase in the metallographic structure of the thickness middle portion is set to 20.0 vol %. The upper limit of the volume fraction of the austenite phase in the metallographic structure of the thickness middle portion may be set to 15.0 vol %, 12.0 vol %, 10.0 vol %, or 6.0 vol %.

(In Case Where Ni Content is Small, Volume Fraction of Austenite Phase: Preferably 6.0 vol % or Less)

In a case where the Ni content is small, the volume fraction of the austenite phase is preferably set to 6.0 vol % or less. The upper limit of the volume fraction of the austenite phase may be set to 5.0 vol %, 4.5 vol %, or 4.0 vol % as necessary.

The remainder of the metallographic structure of the Ni steel according to the present embodiment is mainly tempered martensite. In order to manufacture a Ni steel in which the average grain size and average aspect ratio of prior austenite grains are within the above-described ranges, it is necessary to perform the water cooling, the intermediate heat treatment, and the tempering after the hot rolling. In a case where such a manufacturing method is applied to a steel having the above-described chemical composition, the remainder of the obtained metallographic structure (that is, the primary phase) is necessarily tempered martensite. However, there are cases where the Ni steel according to the present embodiment contains a phase (for example, coarse inclusions) in which the remainder of the metallographic structure is not classified as either austenite or tempered martensite. In a case where the total volume fraction of the austenite phase and the tempered martensite phase in the metallographic structure of the thickness noddle portion is 99% or more, the inclusion of phases other than these is allowed. In addition, in a case of measuring the volume fraction of the tempered martensite phase, the area fraction measured by microstructure observation using nital as a corrosive solution is used as the volume fraction as it is (this is because the area fraction is basically the same as the volume fraction).

The volume fraction of the austenite phase in the thickness middle portion is measured by taking a sample having a surface parallel to the plate surface of the Ni steel from the thickness middle portion of the Ni steel and applying an X-ray diffraction method to the sample. The volume fraction of the austenite phase is obtained from the ratio between the integrated intensities of austenite (face-centered cubic structure) and tempered martensite (body-centered cubic structure) of X-ray peaks. Specifically, the taken sample is subjected to X-ray diffraction, and the volume fraction of the austenite phase may be measured from the ratio between the integrated intensities of the (111) plane, (200) plane, and (211) plane of an α phase having a BCC structure and the integrated intensities of the (111) plane, (200) plane, and (220) plane of an austenite phase having a FCC structure.

In the present embodiment, a treatment (so-called deep cooling treatment) for cooling a test piece to an extremely low temperature is unnecessary before the measurement of the volume fraction of the austenite phase. However, in a case where only a test piece after being subjected to a deep cooling treatment is present, the volume fraction of the austenite phase may be measured using the test piece after being subjected to the deep cooling treatment.

(Average Effective Grain Size Measured in Section of Thickness Middle Portion Parallel to Rolling Direction and Thickness Direction: Preferably 2.0 µm to 7.0 µm)

An average effective grain size measured in the section of the thickness middle portion parallel to the rolling direction and the thickness direction (hereinafter abbreviated to "average effective grain size") is preferably set to 2.0 µm to 7.0 µm. In the present embodiment, an effective grain size is defined as the circle equivalent diameter of a region (effective grain) surrounded by a boundary of a metallographic structure having an orientation difference of 15° or more. In the present embodiment, unless otherwise specified, the average effective grain size indicates an average effective grain size measured in the section of the thickness middle portion parallel to the rolling direction and the thickness direction.

When the effective grain size is refined, resistance to propagation of fracture cracks increases and the toughness of the Ni steel is improved. However, in order to refine the average effective grain size to less than 2.0 µm, methods accompanied by an increase in manufacturing cost such as an increase in the number of heat treatments are necessary. Therefore, the lower limit of the average effective grain size is preferably set to 2.0 µm. The lower limit of the average effective grain size may be set to 3.0 µm, 4.0 µm, or 5.0 µm. On the other hand, when the average effective grain size is more than 7.0 µm, there are cases where stress exerted on inclusions such as coarse cementite, coarse AlN, MnS, and alumina in the prior austenite grain boundaries and tempered martensite increases, which are hard phases that become the brittle fracture origins, increases and the extremely low temperature toughness of the Ni steel decreases. Therefore, the upper limit of the average effective grain size is preferably set to 7.0 µm. The upper limit of the average effective grain size may be set to 6.0 µm, 5.0 µm, or 4.0 µm.

(In Case Where Ni Content is Small, Ti: Average Effective Grain Size: Preferably 4.0 µm or Less)

In a case where the Ni content is small, the upper limit of the average effective grain size is preferably set to 4.0 µm or less. In a case where the Ni content is small, the lower limit and preferable lower limit of the average effective grain size may be the same as those of a Ni steel having a Ni content of 11.5% or more.

The average effective grain size is measured by using an electron backscatter diffraction (EBSD) analyzer attached to a scanning electron microscope, with the section (L-section) of the thickness middle portion parallel to the rolling direction and the thickness direction as an observed section. Observation of five or more visual fields is performed at a magnification of 2,000-fold, and a boundary of a metallographic structure having an orientation difference of 15° or more is regarded as a grain boundary. Grains surrounded by the grain boundaries are regarded as effective grains, and the circle equivalent grain sizes (diameters) of the effective grains are obtained by image processing. By calculating the average value of the circle equivalent grain sizes, the average effective grain size measured in the section of the thickness middle portion parallel to the rolling direction and the thickness direction is obtained.

(Plate Thickness: 4.5 mm to 20 mm)

The Ni steel according to the present embodiment is mainly a Ni steel plate, and the plate thickness thereof is set to 4.5 mm to 20 mm. A Ni steel with a plate thickness of less than 4.5 mm is rarely used as a material for a large scale structure such as a liquid hydrogen tank, so that the lower limit of the plate thickness is set to 4.5 mm. In a case where the plate thickness is more than 20 mm, the cooling rate during the reheating hardening is extremely slow, and it is very difficult to secure the low temperature toughness in the compositional range of the Ni steel according to the present application (particularly, the Ni content). As necessary, the lower limit of the plate thickness may be set to 6 mm, 8 mm, 10 mm, or 12 mm, and the upper limit of the plate thickness may be set to 16 mm, 12 mm, or 11 mm (Yield Stress at Room Temperature: 590 MPa to 710 MPa)

(Tensile Strength at Room Temperature: 690 MPa to 810 MPa)

The yield stress of the Ni steel according to the present embodiment at room temperature is set to 590 MPa to 710 MPa. In addition, the tensile strength of the Ni steel according to the present embodiment at room temperature is set to 690 MPa to 810 MPa. The lower limit of the yield stress at room temperature may be set to 600 MPa, 620 MPa, or 640 MPa. The upper limit of the yield stress at room temperature may be set to 690 MPa, 670 MPa, or 650 MPa. The lower limit of the tensile strength at room temperature may be set to 700 MPa, 720 MPa, or 740 MPa. The upper limit of the tensile strength at room temperature may be set to 780 MPa, 760 MPa, or 750 MPa. In addition, the present embodiment, the room temperature is 20° C.

Next, a method of manufacturing the Ni steel according to the present embodiment will be described. If the Ni steel according to the present embodiment has the above-described configuration regardless of the manufacturing method, the effect can be obtained. However, for example, according to the following manufacturing method, the Ni steel according to the present embodiment can be obtained stably.

The method of manufacturing the Ni steel according to the present embodiment includes: a step of adjusting the amounts of elements in a state in which the temperature of molten steel is set to 1650° C. or lower, the concentration of O in the molten steel is set to 0.01% or less, and the concentration of S in the molten steel is set to 0.02% or less, and thereafter manufacturing a steel piece by continuous casting; a step of heating the obtained steel piece to 950° C. to 1160° C. and retaining the steel piece for 20 minutes to 180 minutes; a step of performing hot rolling on the steel piece under the condition that a cumulative rolling reduction at 950° C. or lower during the hot rolling is 90% to 95% and a finishing temperature is 680° C. to 850° C., thereby obtaining a hot-rolled steel plate; a step of performing water cooling on the hot-rolled steel plate to room temperature with a cooling start temperature of 580° C. to 850° C.; a step of performing an intermediate heat treatment on the hot-rolled steel plate at an intermediate heat treatment temperature of 610° C. to 650° C. for a retention time of 20 minutes to 180 minutes; and a step of performing tempering on the hot-rolled steel plate at a tempering temperature of 530° C. to 570° C. for a retention time of 20 minutes to 180 minutes. These manufacturing conditions are preferably further limited according to the Ni content and the like.

Hereinafter, details of the manufacturing conditions will be described.

(Heating Temperature: 950° C. to 1160° C.)
(Retention Time of Heating: 20 Minutes to 180 Minutes)

Homogenous refinement of prior austenite grains by recrystallization during hot rolling is particularly important in securing the extremely low temperature toughness of the Ni steel according to the present embodiment. Therefore, it is preferable to strictly restrict the temperature and rolling reduction during the hot rolling. The heating temperature of the steel piece during the hot rolling is 950° C. to 1160° C. When the heating temperature is lower than 950° C., there are cases where the heating temperature is lower than a predetermined hot rolling finishing temperature. When the heating temperature is higher than 1160° C., austenite grain sizes become coarse during the heating of the steel piece, and the extremely low temperature toughness of the Ni steel may decrease. The retention time of the heating is 20 minutes to 180 minutes. When the retention time of the heating is shorter than 20 minutes, there are cases where austenitic transformation in steel may not proceed sufficiently. On the other hand, when the retention time of the heating is longer than 180 minutes, there are cases where austenite grains in the steel become coarse.

In a case where the Ni content is small, the heating temperature is set to 950° C. to 1100° C. In a case where the Ni content is small, the retention time of the heating is 20 minutes to 180 minutes.

(Cumulative Rolling Reduction at 950° C. or Lower during Hot Rolling: 90% to 95%)

When the cumulative rolling reduction at 950° C. or lower during the hot rolling is less than 90%, refinement of austenite grains by recrystallization of austenite in the steel piece during the rolling is insufficient, and there are cases where a portion of the austenite grains after the rolling is coarsened and the extremely low temperature toughness of the Ni steel decreases. Therefore, the lower limit of the cumulative rolling reduction at 950° C. or lower during the hot rolling is 90%.

When the cumulative rolling reduction at 950° C. or lower during the hot rolling exceeds 95%, the rolling time becomes long and there is a possibility that the productivity may deteriorate. Therefore, the upper limit of the cumulative rolling reduction at 950° C. or lower during the hot rolling is 95%.

Even in a case where the Ni content is small, the cumulative rolling reduction at 950° C. or lower during the hot rolling is set to 90% to 95%.

(Finishing Temperature of Hot Rolling: 680° C. to 850° C.)

When the finishing temperature of the hot rolling is lower than 680° C., the water cooling start temperature is lower than 580° C., and there are cases where the extremely low temperature toughness of the Ni steel decreases. In addition, when the finishing temperature of the hot rolling is lower than 680° C., the water cooling start temperature is lower than 580° C., and there are cases where the yield stress and tensile strength of the Ni steel at room temperature decrease. Therefore, the lower limit of the finishing temperature of the hot rolling is set to 680° C.

When the finishing temperature of the hot rolling exceeds 850° C., dislocations introduced by rolling are reduced due to recovery and there are cases where the extremely low temperature toughness of the Ni steel is insufficient. In addition, when the finishing temperature of the hot rolling exceeds 850° C., there are cases where the yield stress and tensile strength of the Ni steel at room temperature are insufficient. Therefore, the upper limit of the finishing temperature of the hot rolling is set to 850° C.

In a case where the Ni content is small, the finishing temperature of the hot rolling is set to 680° C. to 770° C.

(Water Cooling Start Temperature: 580° C. to 850° C.)

Cooling after the hot rolling is performed by water cooling. The water cooling finishing temperature is set to 200° C. or lower.

The water cooling start temperature is set to 580° C. to 850° C. When the water cooling start temperature is lower than 580° C., there are cases where the yield stress and tensile strength at room temperature decrease. Therefore, the lower limit of the water cooling start temperature is set to 580° C. The upper limit of the water cooling start temperature is not particularly limited, and water cooling is started immediately after the finish of the hot rolling. Since the upper limit of the finishing temperature of the hot rolling is 850° C., this is set to the upper limit of the water cooling start temperature. The average cooling rate during the water cooling is set to 10° C./s or more.

In a case where the Ni content is small, since the upper limit of the finishing temperature of the hot rolling is 770° C., this is set to the upper limit of the water cooling start temperature. Therefore, in a case where the Ni content is small, the water cooling start temperature is set to 580° C. to 770° C. In addition, even in a case where the Ni content is small, water cooling to 200° C. or lower is performed. The average cooling rate during the water cooling is set to 10° C./s or more.

(Intermediate Heat Treatment Temperature: 610° C. to 650° C.)

(Retention Time of Intermediate Heat Treatment: 20 Minutes to 180 Minutes)

The intermediate heat treatment is a heat treatment in which the hot-rolled steel plate after the water cooling is heated to the intermediate heat treatment temperature, retained at the intermediate heat treatment temperature, and then cooled. The intermediate heat treatment is effective in refining the effective grain size contributing to the improvement of the extremely low temperature toughness, and securing an austenite phase.

The intermediate heat treatment temperature is set to 610° C. to 650° C. When the intermediate heat treatment temperature is lower than 610° C., there are cases where austenitic transformation becomes insufficient. In addition, when the intermediate heat treatment temperature is lower than 610° C., there are cases where the fraction of tempered martensite which is excessively tempered increases, and the strength of the base metal decreases. Furthermore, when the intermediate heat treatment temperature is lower than 610° C., there are cases where the extremely low temperature toughness of the Ni steel decreases. Therefore, the lower limit of the intermediate heat treatment temperature is set to 610° C.

When the intermediate heat treatment temperature exceeds 650° C., the austenitic transformation in the hot-rolled steel plate proceeds excessively. As a result, it becomes difficult to maintain the austenite in a stable state, and there are cases where it is difficult to secure an austenite phase in a volume fraction of 2.0% or more. Furthermore, when the intermediate heat treatment temperature exceeds 650° C., there are cases where the extremely low temperature toughness of the Ni steel decreases. Therefore, the upper limit of the intermediate heat treatment temperature is set to 650° C.

The retention time of the intermediate heat treatment is set to 20 minutes to 180 minutes. In a case where the retention time of the intermediate heat treatment is shorter than 20 minutes, there are cases where the austenitic transformation does not proceed sufficiently. On the other hand, when the retention time of the intermediate heat treatment is longer than 180 minutes, there are cases where carbides precipitate. A cooling method during the intermediate heat treatment is water cooling in order to avoid tempering embrittlement, and water cooling to 200° C. or lower is performed. The average cooling rate during the water cooling is set to 8° C./s or more.

(Tempering Temperature: 530° C. to 570° C.)

(Retention Time of Tempering: 20 Minutes to 180 Minutes)

The tempering is a heat treatment in which the hot-rolled steel plate after being subjected to the intermediate heat treatment is heated to the tempering temperature, retained at the tempering temperature, and then cooled. The tempering is effective in securing the austenite phase. The tempering temperature is set to 530° C. to 570° C.

When the tempering temperature is lower than 530° C., it is difficult to secure the austenite phase in a volume fraction of 2.0% or more, and there are cases where the extremely low temperature toughness of the Ni steel is insufficient. Therefore, the lower limit of the tempering temperature is set to 530° C. When the tempering temperature exceeds 570° C., the austenite phase of the Ni steel at room temperature is more than 20.0 vol %. When such a Ni steel is cooled to an extremely low temperature, a portion of austenite is transformed into high C martensite, and there are cases where the extremely low temperature toughness of the Ni steel decreases. For this reason, the upper limit of the tempering temperature is set to 570° C. or lower.

The retention time of the tempering is set to 20 minutes to 180 minutes. In a case where the retention time of the tempering is shorter than 20 minutes, there are cases where the stability of austenite is not sufficiently secured. On the other hand, in a case where the retention time of the tempering is longer than 180 minutes, there are cases where carbides adversely affecting the toughness of the Ni steel are precipitated, and there are cases where the tensile strength of the Ni steel significantly decreases. A cooling method during the tempering is water cooling in order to avoid tempering embrittlement, and water cooling to 200° C. or lower is performed. The average cooling rate during the water cooling is set to 5° C./s or more.

EXAMPLES

Examples of the present invention will be described below. However, the following examples are examples of the present invention, and the present invention is not limited to the examples described below.

(Example 1: Ni Steel Having Ni Content of 11.5% or More)

Steel was melted by a converter and slabs having a thickness of 100 mm to 360 mm were manufactured by continuous casting. Tables 1 and 2 show the chemical compositions of Kinds of steel A1 to A25. These slabs were heated, subjected to controlled rolling, subjected to water cooling as they are, and subjected to heat treatments including an intermediate heat treatment and tempering, whereby steel plates were manufactured. The retention time of the heating during the hot rolling was set to 30 minutes to 120 minutes. The retention time of the heat treatments including the intermediate heat treatment and the tempering was set to 20 minutes to 60 minutes. Water cooling to 200° C. or lower was performed after the hot rolling. Cooling performed during the heat treatments including the intermediate heat treatment and the tempering was water cooling, and water cooling to 200° C. or lower from the treatment temperature of each of the heat treatments was performed. Samples were taken from the steel plates, and the metallographic structure, tensile properties, and toughness thereof were evaluated.

TABLE 1

| Steel material | Chemical composition remainder consisting of Fe and impurities (mass %) | | | | | | | | | | | |
|---|---|---|---|---|---|---|---|---|---|---|---|---|
| | C | Si | Mn | P | S | Cu | Ni | Cr | Mo | Al | Nb | Ti |
| A1 | 0.040 | 0.10 | 0.30 | 0.003 | 0.0010 | | 11.8 | | 0.20 | 0.025 | 0.016 | |
| A2 | 0.080 | 0.10 | 0.32 | 0.004 | 0.0012 | | 11.7 | 0.30 | 0.15 | 0.027 | | |
| A3 | 0.054 | 0.30 | 0.25 | 0.003 | 0.0012 | | 12.1 | | 0.35 | 0.028 | 0.020 | |
| A4 | 0.055 | 0.25 | 0.20 | 0.004 | 0.0010 | | 12.4 | | 0.50 | 0.015 | | 0.010 |
| A5 | 0.055 | 0.04 | 0.80 | 0.004 | 0.0008 | | 12.0 | | 0.10 | 0.035 | 0.005 | 0.012 |
| A6 | 0.056 | 0.03 | 0.36 | 0.004 | 0.0040 | 0.04 | 12.1 | 0.50 | 0.18 | 0.035 | 0.007 | |
| A7 | 0.047 | 0.08 | 0.42 | 0.003 | 0.0038 | 0.04 | 11.9 | | 0.45 | 0.060 | | |
| A8 | 0.065 | 0.08 | 0.22 | 0.007 | 0.0015 | | 12.2 | | 0.13 | 0.041 | 0.012 | |
| A9 | 0.062 | 0.09 | 0.37 | 0.003 | 0.0011 | 0.50 | 11.5 | | 0.24 | 0.010 | | |
| A10 | 0.058 | 0.07 | 0.65 | 0.005 | 0.0014 | | 11.9 | 0.02 | 0.25 | 0.052 | | 0.020 |
| A11 | 0.050 | 0.05 | 0.54 | 0.004 | 0.0015 | | 12.0 | 0.38 | 0.24 | 0.030 | | |
| A12 | 0.053 | 0.12 | 0.30 | 0.003 | 0.0015 | 0.42 | 11.8 | | 0.30 | 0.045 | | |
| A13 | 0.068 | 0.12 | 0.30 | 0.006 | 0.0028 | | 12.1 | | 0.30 | 0.029 | | |

| Steel material | Chemical composition remainder consisting of Fe and impurities (mass %) | | | | | | |
|---|---|---|---|---|---|---|---|
| | V | B | Ca | REM | N | O | Note |
| A1 | | | | | 0.0040 | 0.0015 | Present |
| A2 | | | | | 0.0041 | 0.0016 | Invention |
| A3 | 0.055 | | | | 0.0040 | 0.0014 | Example |
| A4 | | | | | 0.0035 | 0.0013 | |
| A5 | 0.026 | | | | 0.0035 | 0.0010 | |
| A6 | | 0.0015 | | | 0.0036 | 0.0009 | |
| A7 | | | | 0.0033 | 0.0025 | 0.0007 | |
| A8 | 0.080 | | 0.0028 | | 0.0025 | 0.0010 | |
| A9 | | 0.0020 | | | 0.0024 | 0.0010 | |
| A10 | | | 0.0040 | | 0.0026 | 0.0011 | |
| A11 | | 0.0008 | | 0.0050 | 0.0015 | 0.0012 | |
| A12 | | | | | 0.0060 | 0.0011 | |
| A13 | 0.005 | | | | 0.0045 | 0.0030 | |

Blank means that no element is intentionally added.

TABLE 2

| Steel material | Chemical composition remainder consisting of Fe and impurities (mass %) | | | | | | | | | | | |
|---|---|---|---|---|---|---|---|---|---|---|---|---|
| | C | Si | Mn | P | S | Cu | Ni | Cr | Mo | Al | Nb | Ti |
| A14 | 0.036 | 0.10 | 0.30 | 0.004 | 0.0012 | | 11.7 | | 0.21 | 0.040 | | |
| A15 | 0.085 | 0.14 | 0.30 | 0.005 | 0.0015 | | 11.8 | | 0.20 | 0.041 | | |
| A16 | 0.051 | 0.34 | 0.30 | 0.003 | 0.0021 | 0.06 | 12.3 | | 0.20 | 0.038 | 0.010 | 0.010 |
| A17 | 0.052 | 0.08 | 0.16 | 0.004 | 0.0016 | 0.40 | 12.2 | | 0.19 | 0.035 | | |
| A18 | 0.053 | 0.12 | 0.86 | 0.004 | 0.0018 | | 12.0 | | 0.44 | 0.035 | 0.008 | |

TABLE 2-continued

| Steel material | | | | | | | | | | | |
|---|---|---|---|---|---|---|---|---|---|---|---|
| A19 | 0.055 | 0.09 | 0.31 | <u>0.008</u> | 0.0025 | | 12.0 | 0.05 | 0.29 | 0.036 | |
| A20 | 0.055 | 0.13 | 0.31 | 0.004 | <u>0.0046</u> | | 12.3 | | 0.40 | 0.036 | 0.011 |
| A21 | 0.050 | 0.13 | 0.32 | 0.002 | 0.0020 | 0.10 | 11.7 | <u>0.57</u> | 0.22 | 0.020 | 0.010 0.009 |
| A22 | 0.049 | 0.13 | 0.30 | 0.004 | 0.0014 | | 12.2 | | <u>0.06</u> | 0.021 | |
| A23 | 0.049 | 0.07 | 0.25 | 0.003 | 0.0010 | | 12.1 | 0.25 | 0.13 | <u>0.068</u> | 0.012 |
| A24 | 0.049 | 0.07 | 0.25 | 0.004 | 0.0012 | | 12.0 | | 0.15 | 0.019 | <u>0.024</u> |
| A25 | 0.050 | 0.07 | 0.24 | 0.004 | 0.0008 | | 11.9 | | 0.35 | 0.018 | <u>0.025</u> |

| Steel material | Chemical composition remainder consisting of Fe and impurities (mass %) | | | | | | |
|---|---|---|---|---|---|---|---|
| | V | B | Ca | REM | N | O | Note |
| A14 | | | | | 0.0041 | 0.0010 | Comparative Example |
| A15 | | | | | 0.0039 | 0.0022 | |
| A16 | 0.010 | 0.0012 | | 0.0015 | 0.0039 | 0.0012 | |
| A17 | | | | | 0.0038 | 0.0012 | |
| A18 | 0.003 | | | | 0.0040 | 0.0009 | |
| A19 | | 0.0013 | | 0.0023 | 0.0035 | 0.0010 | |
| A20 | 0.041 | | | | 0.0035 | 0.0012 | |
| A21 | 0.050 | | | | 0.0035 | 0.0015 | |
| A22 | | | | | 0.0020 | 0.0015 | |
| A23 | | 0.0008 | 0.0027 | | 0.0025 | 0.0014 | |
| A24 | | <u>0.0025</u> | 0.0021 | | 0.0030 | 0.0014 | |
| A25 | 0.005 | | | | <u>0.0064</u> | 0.0012 | |

Blank means that no element is intentionally added.
Underline means outside the range of the present invention.

The average grain size of prior austenite grains (hereinafter, sometimes referred to as the average grain size of prior austenite) to be measured in a section of a thickness middle portion parallel to a rolling direction and a thickness direction was measured in a section (L-section) of a thickness middle portion parallel to a rolling direction and a thickness direction as an observed section. The grain size of the prior austenite was measured according to JIS G 0551. First, the prior austenite grain boundaries were revealed by corroding the observed section of the sample with a saturated aqueous solution of picric acid. An enlarged photograph of the L-section subjected to the corrosion treatment was photographed at five or more visual fields with a scanning electron microscope (SEM) at a magnification of 1,000-fold or 2,000-fold. The circle equivalent grain sizes (diameters) of at least 20 prior austenite grains having a circle equivalent diameter (diameter) of 2.0 μm or more, which were included in these SEM photographs, were obtained by image processing. By calculating the average value of these circle equivalent diameters, the average grain size of the prior austenite was obtained.

In addition, in the steel of the present invention, the refinement of the prior austenite grains, suppression of the P content, and the like are carried out so that fracture is less likely to occur at the prior austenite grain boundaries. Therefore, there are cases where it is difficult to identify the prior austenite grain boundaries by performing the corrosion treatment on the L-section. In such a case, after heating the sample to 450° C. to 490° C., a heat treatment of temperature retention for one hour or longer was performed, and then the average grain size of the prior austenite was measured by the method described above.

In a case where identification of the prior austenite grain boundaries was difficult even if the heat treatment at 450° C. to 490° C. was performed, a Charpy test piece was taken from the heat-treated sample, an impact test at −196° C. was conducted using the test piece, and a sample in which fracture had occurred at the prior austenite grain boundaries was used for measurement of the average grain size of austenite. In this case, a cross section of a fracture surface at the section (L-section) parallel to the rolling direction and the thickness direction was created and subjected to the corrosion treatment. Thereafter, the average grain size of the prior austenite grains was measured by identifying the prior austenite grain boundaries of the cross section of the fracture surface of the thickness middle portion with the scanning electron microscope. When the prior austenite grain boundaries are embrittled by the heat treatment described above, minute cracks are generated at the prior austenite grain boundaries due to an impact load during the Charpy test, so that the prior austenite grain boundaries are easily identified.

Regarding the average aspect ratio of the prior austenite grains (hereinafter, sometimes referred to as the average aspect ratio of prior austenite grains) measured in the section of the thickness middle portion parallel to the rolling direction and the thickness direction, the ratios (aspect ratios) between the length in the rolling direction and the length in the thickness direction of at least 20 prior austenite grains having a circle equivalent diameter (diameter) of 2.0 μm or more, which were included in the above SEM photographs, were measured, and the average value thereof was obtained as the average aspect ratio of the prior austenite grains.

The volume fraction of the austenite phase contained in the metallographic structure of the thickness middle portion (hereinafter, sometimes referred to as the volume fraction of the austenite phase) was measured by taking a sample having a surface parallel to the plate surface from the thickness middle portion of the Ni steel and applying an X-ray diffraction method to the sample. The volume fraction of the austenite phase was determined from the ratio between the integrated intensities of austenite (face-centered cubic structure) and tempered martensite (body-centered cubic structure) of X-ray peaks.

The average effective grain size measured in the section of the thickness middle portion parallel to the rolling direction and the thickness direction (hereinafter, sometimes referred to as the average effective grain size) was measured by using an EBSD analyzer attached to the scanning electron microscope, with the section (L-section) of the thickness middle portion of the Ni steel parallel to the rolling direction and the thickness direction as an observed section. Observation of five or more visual fields was performed at a magnification of 2,000-fold, and a boundary of a metallographic structure having an orientation difference of 15° or more was regarded as a grain boundary. Grains surrounded by the grain boundaries were regarded as effective grains, and the circle equivalent grain sizes (diameters) were obtained from the areas thereof by image processing. By calculating the average value of the circle equivalent grain sizes, an average effective grain size was obtained.

By taking a 1A full-thickness tensile test piece specified in JIS Z 2241 whose longitudinal direction was parallel to the rolling direction (L direction), the strength (yield stress and tensile strength) at room temperature was measured at room temperature by the method specified in JIS Z 2241. The target value of the yield stress is 590 MPa to 710 MPa, and the target value of the tensile strength is 690 MPa to 810 MPa. The yield stress was a lower yield stress. However, there were many cases where no clear lower yield stress was observed, and in that case, the 0.2% proof stress was taken as the yield stress.

Regarding the extremely low temperature toughness, a CT test piece of full thickness with front and rear surfaces of the sample each ground 0.5 mm was taken in a direction (C direction) perpendicular to the rolling direction. A J-R curve was created according to the unloading compliance method specified in ASTM standard E1820-13 in liquid hydrogen (−253° C.), and a J value was converted into a $K_{IC}$ value. The target value of the extremely low temperature toughness is 150 MPa·√m or more.

Tables 3 and 4 show the plate thickness, manufacturing method, base metal properties, and metallographic structure of steel plates (Steel materials Nos. a1 to a36) manufactured using slabs having the chemical compositions of Kinds of steel A1 to A25.

TABLE 3

| Manufacturing condition No. | Steel material | Plate thickness (mm) | Heating temperature during rolling (° C.) | Cumulative rolling reduction at 950° C. or lower (%) | Rolling finishing temperature (° C.) | Water cooling start temperature after rolling (° C.) | Intermediate heat treatment temperature (° C.) | Tempering temperature (° C.) |
|---|---|---|---|---|---|---|---|---|
| a1 | A1 | 12 | 970 | 94 | 720 | 670 | 620 | 530 |
| a2 | A2 | 20 | 1100 | 92 | 740 | 700 | 620 | 570 |
| a3 | A3 | 18 | 1070 | 95 | 680 | 640 | 640 | 540 |
| a4 | A4 | 18 | 1060 | 92 | 820 | 770 | 610 | 540 |
| a5 | A5 | 18 | 1080 | 92 | 790 | 740 | 610 | 550 |
| a6 | A5 | 18 | 1150 | 92 | 840 | 790 | 640 | 550 |
| a7 | A6 | 20 | 1150 | 90 | 760 | 720 | 640 | 540 |
| a8 | A7 | 20 | 1090 | 91 | 800 | 760 | 640 | 540 |
| a9 | A8 | 12 | 990 | 94 | 700 | 650 | 640 | 530 |
| a10 | A9 | 18 | 1050 | 92 | 820 | 770 | 610 | 540 |
| a11 | A10 | 18 | 1140 | 90 | 770 | 730 | 650 | 550 |
| a12 | A11 | 20 | 1160 | 91 | 780 | 730 | 610 | 560 |
| a13 | A12 | 18 | 1040 | 92 | 830 | 780 | 610 | 550 |
| a14 | A13 | 18 | 950 | 92 | 850 | 810 | 610 | 540 |

| Manufacturing condition No. | Metallographic structure | | | | Base metal properties | | | |
|---|---|---|---|---|---|---|---|---|
| | Average grain size of prior austenite grains (μm) | Average aspect ratio of prior austenite grains | Volume fraction of austenite phase (%) | Average effective grain size (μm) | Yield stress (MPa) | Tensile strength (MPa) | Extremely low temperature toughness* (MPa · √m) | Note |
| a1 | 3.0 | 9.1 | 4.8 | 2.5 | 607 | 711 | 200 | Present |
| a2 | 6.3 | 8.1 | 12.4 | 4.5 | 650 | 763 | 153 | Invention |
| a3 | 5.7 | 9.9 | 10.5 | 4.1 | 634 | 751 | 164 | Example |
| a4 | 5.4 | 4.8 | 9.1 | 4.3 | 620 | 736 | 170 | |
| a5 | 5.6 | 6.2 | 2.6 | 4.4 | 651 | 762 | 161 | |
| a6 | 9.1 | 3.9 | 2.0 | 7.5 | 636 | 759 | 153 | |
| a7 | 10.3 | 7.4 | 13.0 | 5.6 | 676 | 781 | 155 | |
| a8 | 5.9 | 5.4 | 11.8 | 4.3 | 651 | 754 | 153 | |
| a9 | 4.8 | 8.1 | 3.6 | 3.0 | 633 | 732 | 195 | |
| a10 | 5.3 | 5.3 | 5.5 | 3.9 | 628 | 741 | 168 | |
| a11 | 11.2 | 7.4 | 14.2 | 6.3 | 661 | 766 | 151 | |
| a12 | 11.9 | 6.6 | 14.9 | 6.9 | 694 | 808 | 151 | |
| a13 | 5.2 | 3.3 | 6.5 | 2.2 | 619 | 722 | 172 | |
| a14 | 5.3 | 2.6 | 5.3 | 2.1 | 619 | 718 | 186 | |

*Extremely low temperature toughness is the $K_{I}C$ value (converted from J value) in liquid hydrogen (−253° C.), the unit is MPa · √m.

TABLE 4

| Manufacturing condition No. | Steel material | Plate thickness (mm) | Heating temperature during rolling (° C.) | Cumulative rolling reduction at 950° C. or lower (%) | Rolling finishing temperature (° C.) | Water cooling start temperature after rolling (° C.) | Intermediate heat treatment temperature (° C.) | Tempering temperature (° C.) |
|---|---|---|---|---|---|---|---|---|
| a15 | A14 | 20 | 1080 | 91 | 790 | 750 | 620 | 530 |
| a16 | A15 | 20 | 1100 | 91 | 800 | 760 | 610 | 530 |
| a17 | A16 | 20 | 1100 | 91 | 800 | 760 | 620 | 530 |
| a18 | A17 | 20 | 1110 | 91 | 810 | 760 | 640 | 550 |
| a19 | A18 | 20 | 1090 | 91 | 800 | 760 | 620 | 550 |
| a20 | A19 | 20 | 1100 | 91 | 800 | 760 | 610 | 530 |
| a21 | A20 | 20 | 1090 | 91 | 780 | 770 | 610 | 540 |
| a22 | A21 | 20 | 1100 | 91 | 790 | 760 | 620 | 540 |
| a23 | A22 | 20 | 1070 | 91 | 830 | 790 | 610 | 550 |
| a24 | A23 | 20 | 1100 | 91 | 780 | 740 | 610 | 530 |
| a25 | A24 | 20 | 1150 | 91 | 800 | 760 | 610 | 530 |
| a26 | A25 | 20 | 1100 | 91 | 840 | 800 | 610 | 530 |
| a27 | A4 | 20 | 1180 | 91 | 840 | 800 | 610 | 530 |
| a28 | A4 | 20 | 1050 | 67 | 840 | 800 | 610 | 530 |
| a29 | A4 | 20 | 1040 | 91 | 880 | 840 | 610 | 540 |
| a30 | A3 | 18 | 940 | 95 | 670 | 630 | 630 | 540 |
| a31 | A4 | 20 | 920 | 91 | 690 | 660 | 610 | 530 |
| a32 | A4 | 20 | 960 | 91 | 670 | 640 | 610 | 530 |
| a33 | A4 | 20 | 1050 | 91 | 840 | 800 | 680 | 530 |
| a34 | A4 | 20 | 1050 | 91 | 840 | 800 | 580 | 530 |
| a35 | A4 | 20 | 1050 | 91 | 840 | 800 | 610 | 580 |
| a36 | A4 | 20 | 1050 | 91 | 840 | 800 | 610 | 500 |

| Manufacturing condition No. | Average grain size of prior austenite grains (μm) | Average aspect ratio of prior austenite grains | Volume fraction of austenite phase (%) | Average effective grain size (μm) | Yield stress (MPa) | Tensile strength (MPa) | Extremely low temperature toughness* (MPa · √m) | Note |
|---|---|---|---|---|---|---|---|---|
| a15 | 9.4 | 5.0 | <u>1.8</u> | 7.5 | <u>579</u> | <u>672</u> | 79 | Comparative Example |
| a16 | 6.3 | 4.9 | 4.8 | 4.1 | 630 | 739 | 75 | |
| a17 | 8.2 | 7.3 | 6.9 | 5.5 | 628 | 735 | 74 | |
| a18 | 8.6 | 4.7 | <u>1.6</u> | 7.3 | 598 | 701 | 78 | |
| a19 | 6.4 | 6.5 | 8.5 | 4.0 | 679 | 799 | 69 | |
| a20 | 6.2 | 4.6 | 7.5 | 4.2 | 631 | 738 | 74 | |
| a21 | 6.0 | 8.5 | 6.0 | 4.1 | 644 | 759 | 73 | |
| a22 | 6.3 | 8.3 | 5.7 | 3.9 | 665 | 772 | 72 | |
| a23 | 5.5 | 4.4 | 6.5 | 4.6 | <u>572</u> | <u>662</u> | 83 | |
| a24 | 4.9 | 5.3 | 7.1 | 3.8 | 628 | 734 | 75 | |
| a25 | 9.6 | <u>12.8</u> | 6.9 | 7.8 | 601 | 690 | 68 | |
| a26 | 6.7 | 4.1 | 7.4 | 4.9 | 621 | 729 | 75 | |
| a27 | <u>13.4</u> | 4.1 | 8.5 | 9.0 | 626 | 738 | 96 | |
| a28 | <u>13.9</u> | 3.8 | 8.1 | 10.3 | 620 | 731 | 95 | |
| a29 | <u>12.9</u> | <u>2.4</u> | 8.4 | 8.8 | 611 | 724 | 98 | |
| a30 | 9.5 | <u>13.5</u> | 6.8 | 6.8 | 662 | 759 | 83 | |
| a31 | 8.8 | <u>11.0</u> | 6.3 | 4.2 | 628 | 740 | 88 | |
| a32 | 9.3 | <u>13.0</u> | 6.5 | 4.0 | 631 | 737 | 90 | |
| a33 | 6.0 | 5.1 | <u>1.9</u> | 3.9 | 595 | 724 | 95 | |
| a34 | 6.2 | 4.9 | <u>1.2</u> | 4.3 | 629 | 732 | 92 | |
| a35 | 5.8 | 5.0 | 8.1 | 3.8 | <u>713</u> | 801 | 72 | |
| a36 | 5.8 | 5.0 | <u>1.7</u> | 3.8 | <u>715</u> | 804 | 71 | |

Underline means outside the range of the present invention.
*Extremely low temperature toughness is the $K_JC$ value (converted from J value) in liquid hydrogen (−253° C.), the unit is MPa · √m.

As is apparent from Tables 3 and 4, in Manufacturing Nos. a1 to a14, the yield stress and tensile strength at room temperature and the extremely low temperature toughness satisfied the target values.

Contrary to this, in Manufacturing No. a15 which is a comparative example, the C content was small, and the volume fraction of the austenite phase was small, so that the yield stress and tensile strength at room temperature and the extremely low temperature toughness had decreased. In Manufacturing No. a18, the Mn content was small, and the volume fraction of the austenite phase was small, so that the extremely low temperature toughness had decreased.

In each of Manufacturing Nos. a16, a17, a19 to a22, and a24, the C content, Si content, Mn content, P content, S content, Cr content, and Al content were large, so that the extremely low temperature toughness had decreased. In Manufacturing No. a23, the Mo content was small, so that the yield stress and tensile strength at room temperature had decreased and the extremely low temperature toughness had also decreased.

In Manufacturing No. a25, the Nb content and the B content were large, and the aspect ratio of the prior austenite grains was large, so that the extremely low temperature toughness had decreased. In Manufacturing No. a26, the Ti content and the N content were large, so that the extremely low temperature toughness had decreased.

Manufacturing Nos. a27 to a36 are examples in which manufacturing conditions that deviated from preferable ranges are adopted. In Manufacturing No. a27, the heating temperature was high, so that the average grain size of the prior austenite grains had increased and the extremely low temperature toughness had decreased. In Manufacturing No. a28, the cumulative rolling reduction at 950° C. or lower during the hot rolling was low, so that the average grain size of the prior austenite grains had increased, the average effective grain size had increased, and the extremely low temperature toughness had decreased.

In Manufacturing No. a29, the rolling finishing temperature was high, so that the average grain size of the prior austenite grains had increased, the average effective grain size had also increased, and the extremely low temperature toughness had decreased. In Manufacturing No. a30, the heating temperature and rolling finishing temperature were low, so that the aspect ratio of the prior austenite grains had increased, and the extremely low temperature toughness had decreased.

In Manufacturing No. a31, the heating temperature was low, so that the average aspect ratio of the prior austenite grains had increased, and the extremely low temperature toughness had decreased. In Manufacturing No. a32, the rolling finishing temperature was low, so that the aspect ratio of the prior austenite grains had increased, and the extremely low temperature toughness had decreased.

In Manufacturing No. a33, the intermediate heat treatment temperature was high, so that the volume fraction of the austenite phase was small, and the extremely low temperature toughness had decreased. In Manufacturing No. a34, the intermediate heat treatment temperature was low, so that the volume fraction of the austenite phase was small, and the extremely low temperature toughness had decreased.

In Manufacturing No. a35, the tempering temperature was high, so that the yield stress had increased and the extremely low temperature toughness had decreased. In Manufacturing No. a36, the tempering temperature was low, so that the volume fraction of the austenite phase was small, the yield stress had increased, and the extremely low temperature toughness had decreased.

(Example 2: Ni Steel Having Ni Content of Less Than 11.5%)

Steel was melted by a converter and slabs having a thickness of 100 mm to 300 mm were manufactured by continuous casting. Tables 5 and 6 show the chemical compositions of Kinds of steel B1 to B25. These slabs were heated, subjected to controlled rolling, subjected to water cooling as they are, and subjected to heat treatments including an intermediate heat treatment and tempering, whereby steel plates were manufactured. The retention time of the steel piece heating during the hot rolling was set to 30 minutes to 120 minutes. The retention time of the heat treatments including the intermediate heat treatment and the tempering was set to 20 minutes to 60 minutes. Water cooling to 200° C. or lower was performed after the hot rolling. Cooling performed during the heat treatments including the intermediate heat treatment and the tempering was water cooling, and water cooling to 200° C. or lower from the treatment temperature of each of the heat treatments was performed. Samples were taken from the steel plates, and the metallographic structure, tensile properties, and toughness thereof were evaluated.

TABLE 5

| Steel material | Chemical composition remainder consisting of Fe and impurities (mass %) | | | | | | | | | | | |
|---|---|---|---|---|---|---|---|---|---|---|---|---|
| | C | Si | Mn | P | S | Cu | Ni | Cr | Mo | Al | Nb | Ti |
| B1 | 0.040 | 0.12 | 0.38 | 0.0040 | 0.0010 | | 10.7 | | 0.15 | 0.030 | 0.008 | |
| B2 | 0.070 | 0.06 | 0.36 | 0.0030 | 0.0009 | | 10.8 | | 0.12 | 0.032 | | 0.010 |
| B3 | 0.052 | 0.19 | 0.34 | 0.0020 | 0.0009 | | 11.0 | | 0.32 | 0.031 | 0.015 | |
| B4 | 0.053 | 0.10 | 0.20 | 0.0030 | 0.0010 | 0.05 | 11.4 | | 0.50 | 0.035 | | |
| B5 | 0.049 | 0.15 | 0.40 | 0.0040 | 0.0008 | 0.02 | 11.0 | | 0.10 | 0.029 | | |
| B6 | 0.047 | 0.03 | 0.39 | 0.0040 | 0.0030 | | 11.0 | 0.35 | 0.20 | 0.028 | | |
| B7 | 0.050 | 0.04 | 0.39 | 0.0030 | 0.0016 | | 11.1 | | 0.20 | 0.050 | | |
| B8 | 0.067 | 0.04 | 0.22 | 0.0050 | 0.0010 | | 11.2 | | 0.17 | 0.031 | 0.010 | |
| B9 | 0.064 | 0.05 | 0.38 | 0.0030 | 0.0008 | 0.50 | 10.5 | | 0.15 | 0.010 | | |
| B10 | 0.060 | 0.04 | 0.37 | 0.0030 | 0.0013 | | 10.9 | 0.02 | 0.14 | 0.032 | | 0.015 |
| B11 | 0.065 | 0.06 | 0.39 | 0.0030 | 0.0016 | 0.03 | 10.8 | 0.03 | 0.16 | 0.020 | | |
| B12 | 0.064 | 0.12 | 0.28 | 0.0030 | 0.0010 | 0.20 | 10.9 | | 0.12 | 0.025 | | |
| B13 | 0.062 | 0.17 | 0.26 | 0.0040 | 0.0009 | 0.40 | 11.0 | | 0.30 | 0.035 | | |

| Steel material | Chemical composition remainder consisting of Fe and impurities (mass %) | | | | | | |
|---|---|---|---|---|---|---|---|
| | V | B | Ca | REM | N | O | Note |
| B1 | | | | | 0.0035 | 0.0012 | Present |
| B2 | | | | | 0.0034 | 0.0013 | Invention |
| B3 | 0.010 | | | | 0.0034 | 0.0015 | Example |
| B4 | | | | | 0.0036 | 0.0010 | |
| B5 | 0.003 | | | | 0.0025 | 0.0013 | |
| B6 | | | | 0.0010 | 0.0036 | 0.0017 | |
| B7 | | | | | 0.0042 | 0.0007 | |
| B8 | 0.060 | | | | 0.0029 | 0.0009 | |
| B9 | | 0.0020 | | | 0.0030 | 0.0010 | |
| B10 | | 0.0010 | 0.0040 | | 0.0040 | 0.0008 | |
| B11 | | | | 0.0050 | 0.0015 | 0.0014 | |
| B12 | | 0.0003 | 0.0025 | | 0.0050 | 0.0015 | |
| B13 | 0.005 | | | | 0.0043 | 0.0030 | |

Blank means that no element is intentionally added.

TABLE 6

| Steel material | Chemical composition remainder consisting of Fe and impurities (mass %) | | | | | | | | | | | |
|---|---|---|---|---|---|---|---|---|---|---|---|---|
| | C | Si | Mn | P | S | Cu | Ni | Cr | Mo | Al | Nb | Ti |
| B14 | <u>0.035</u> | 0.12 | 0.23 | 0.0040 | 0.0010 | | 11.1 | | 0.15 | 0.030 | 0.008 | |
| B15 | <u>0.075</u> | 0.18 | 0.38 | 0.0040 | 0.0009 | | 11.0 | 0.28 | 0.12 | 0.032 | | 0.010 |
| B16 | 0.066 | <u>0.25</u> | 0.37 | 0.0040 | 0.0009 | 0.32 | 11.1 | 0.30 | 0.12 | 0.046 | 0.014 | |
| B17 | 0.044 | 0.04 | <u>0.15</u> | 0.0030 | 0.0010 | 0.05 | 11.1 | | 0.21 | 0.035 | | |
| B18 | 0.067 | 0.19 | <u>0.45</u> | 0.0050 | 0.0008 | 0.02 | 11.2 | | 0.11 | 0.029 | | |
| B19 | 0.068 | 0.18 | 0.39 | <u>0.0060</u> | 0.0025 | | 11.2 | | 0.12 | 0.028 | | |
| B20 | 0.066 | 0.17 | 0.38 | 0.0030 | <u>0 0040</u> | | 11.3 | | 0.11 | 0.049 | | |
| B21 | 0.067 | 0.18 | 0.37 | 0.0050 | 0.0026 | 0.36 | 10.9 | <u>0.44</u> | 0.20 | 0.031 | 0.010 | |
| B22 | 0.043 | 0.05 | 0.23 | 0.0030 | 0.0008 | | 11.1 | | <u>0.07</u> | 0.025 | | |
| B23 | 0.069 | 0.19 | 0.38 | 0.0040 | 0.0027 | | 11.0 | 0.25 | 0.12 | <u>0.059</u> | | 0.015 |
| B24 | 0.064 | 0.12 | 0.35 | 0.0030 | 0.0010 | 0.20 | 11.2 | | 0.12 | 0.025 | <u>0.018</u> | |
| B25 | 0.062 | 0.17 | 0.38 | 0.0040 | 0.0009 | 0.40 | 10.8 | | 0.30 | 0.035 | | <u>0.017</u> |

| Steel material | Chemical composition remainder consisting of Fe and impurities (mass %) | | | | | | |
|---|---|---|---|---|---|---|---|
| | V | B | Ca | REM | N | O | Note |
| B14 | | | | | 0.0035 | 0.0013 | Comparative Example |
| B15 | | 0.0010 | | | 0.0034 | 0.0014 | |
| B16 | 0.010 | | | | 0.0047 | 0.0012 | |
| B17 | | | | 0.0025 | 0.0036 | 0.0012 | |
| B18 | 0.003 | | | | 0.0040 | 0.0014 | |
| B19 | | | | 0.0010 | 0.0048 | 0.0024 | |
| B20 | | | | | 0.0042 | 0.0016 | |
| B21 | 0.055 | | | | 0.0029 | 0.0017 | |
| B22 | | | | | 0.0030 | 0.0016 | |
| B23 | | 0.0010 | 0.0030 | | 0.0046 | 0.0027 | |
| B24 | | <u>0.0028</u> | 0.0025 | | 0.0047 | 0.0019 | |
| B25 | 0.005 | | | | <u>0.0057</u> | 0.0010 | |

Blank means that no element is intentionally added.
Underline means outside the range of the present invention.

A method of identifying the metallographic structure of the sample, a method of evaluating the mechanical properties, and acceptance criteria for the mechanical properties in Example 2 were the same as those for the samples disclosed in Tables 1 to 4. Tables 7 and 8 show the plate thickness, manufacturing method, base metal properties, and metallographic structure of steel materials (Manufacturing Nos. b1 to b36) manufactured using slabs having the chemical compositions of Kinds of steel B1 to B25.

TABLE 7

| | | | Heating, rolling, and heat treatment conditions | | | | | |
|---|---|---|---|---|---|---|---|---|
| Manufacturing condition No. | Steel material | Plate thickness (mm) | Heating temperature during rolling (° C.) | Cumulative rolling reduction at 950° C. or lower (%) | Rolling finishing temperature (° C.) | Water cooling start temperature after rolling (° C.) | Intermediate heat treatment temperature (° C.) | Tempering temperature (° C.) |
| b1 | B1 | 12 | 1050 | 95 | 700 | 640 | 650 | 550 |
| b2 | B2 | 12 | 1070 | 90 | 770 | 720 | 630 | 550 |
| b3 | B3 | 14 | 1050 | 91 | 740 | 680 | 640 | 540 |
| b4 | B4 | 16 | 1060 | 90 | 680 | 580 | 630 | 550 |
| b5 | B5 | 12 | 1030 | 92 | 720 | 650 | 630 | 540 |
| b6 | B5 | 14 | 1080 | 90 | 760 | 700 | 640 | 540 |
| b7 | B6 | 16 | 1050 | 91 | 690 | 620 | 630 | 550 |
| b8 | B7 | 14 | 1100 | 92 | 720 | 660 | 630 | 540 |
| b9 | B8 | 14 | 990 | 94 | 750 | 680 | 610 | 530 |
| b10 | B9 | 16 | 950 | 93 | 740 | 670 | 630 | 560 |
| b11 | B10 | 12 | 970 | 94 | 730 | 670 | 630 | 540 |
| b12 | B11 | 12 | 1020 | 93 | 760 | 700 | 630 | 550 |
| b13 | B12 | 14 | 980 | 93 | 710 | 640 | 630 | 550 |
| b14 | B13 | 16 | 1000 | 92 | 730 | 670 | 630 | 540 |

TABLE 7-continued

| | Metallographic structure | | | | Base metal properties | | | |
|---|---|---|---|---|---|---|---|---|
| Manufacturing condition No. | Average grain size of prior austenite grains (μm) | Average aspect ratio of prior austenite grains | Volume fraction of austenite phase (%) | Average effective grain size (μm) | Yield stress (MPa) | Tensile strength (MPa) | Extremely low temperature toughness* (MPa·√m) | Note |
| b1 | 4.5 | 3.7 | 3.8 | 3.5 | 601 | 702 | 180 | Present |
| b2 | 6.0 | 2.6 | 3.6 | 3.4 | 628 | 719 | 179 | Invention |
| b3 | 4.8 | 3.4 | 3.5 | 2.2 | 665 | 766 | 157 | Example |
| b4 | 3.0 | 6.1 | 2.7 | 2.4 | 658 | 757 | 158 | |
| b5 | 4.3 | 3.2 | 5.0 | 3.6 | 606 | 710 | 178 | |
| b6 | 5.6 | 3.0 | 2.1 | 4.8 | 621 | 722 | 150 | |
| b7 | 3.6 | 4.3 | 4.7 | 2.1 | 688 | 780 | 154 | |
| b8 | 3.7 | 3.3 | 4.6 | 3.2 | 635 | 723 | 165 | |
| b9 | 5.2 | 3.5 | 2.2 | 2.4 | 650 | 748 | 161 | |
| b10 | 4.9 | 2.8 | 4.3 | 2.5 | 645 | 740 | 163 | |
| b11 | 3.8 | 3.2 | 4.2 | 3.6 | 628 | 719 | 170 | |
| b12 | 5.5 | 2.7 | 4.6 | 2.9 | 651 | 742 | 163 | |
| b13 | 3.5 | 3.4 | 2.8 | 2.7 | 653 | 744 | 162 | |
| b14 | 4.0 | 3.0 | 2.5 | 2.0 | 695 | 778 | 151 | |

*Extremely low temperature toughness is the $K_I C$ value (converted from J value) in liquid hydrogen (−253° C.), the unit is MPa·√m.

TABLE 8

| | | | Heating, rolling, and heat treatment conditions | | | | | |
|---|---|---|---|---|---|---|---|---|
| Manufacturing condition No. | Steel material | Plate thickness (mm) | Heating temperature during rolling (° C.) | Cumulative rolling reduction at 950° C. or lower (%) | Rolling finishing temperature (° C.) | Water cooling start temperature after rolling (° C.) | Intermediate heat treatment temperature (° C.) | Tempering temperature (° C.) |
| b15 | B14 | 16 | 1020 | 92 | 720 | 660 | 640 | 540 |
| b16 | B15 | 14 | 1040 | 93 | 750 | 700 | 630 | 550 |
| b17 | B16 | 16 | 1060 | 92 | 740 | 670 | 630 | 550 |
| b18 | B17 | 16 | 1060 | 92 | 720 | 650 | 630 | 540 |
| b19 | B18 | 14 | 1070 | 93 | 730 | 660 | 630 | 540 |
| b20 | B19 | 16 | 1040 | 92 | 710 | 640 | 630 | 540 |
| b21 | B20 | 16 | 1020 | 92 | 720 | 660 | 630 | 540 |
| b22 | B21 | 12 | 1060 | 94 | 750 | 680 | 640 | 550 |
| b23 | B22 | 16 | 1050 | 90 | 770 | 700 | 630 | 550 |
| b24 | B23 | 16 | 1050 | 92 | 730 | 670 | 630 | 550 |
| b25 | B24 | 14 | 1050 | 93 | 760 | 700 | 630 | 550 |
| b26 | B25 | 16 | 1050 | 92 | 710 | 650 | 640 | 550 |
| b27 | B6 | 16 | 1130 | 92 | 760 | 700 | 630 | 540 |
| b28 | B6 | 16 | 1080 | 87 | 760 | 690 | 630 | 540 |
| b29 | B6 | 16 | 1080 | 92 | 780 | 720 | 630 | 550 |
| b30 | B3 | 14 | 940 | 91 | 670 | 610 | 640 | 550 |
| b31 | B6 | 16 | 930 | 92 | 690 | 640 | 630 | 540 |
| b32 | B6 | 16 | 950 | 92 | 660 | 610 | 630 | 540 |
| b33 | B6 | 16 | 1080 | 92 | 760 | 690 | 670 | 540 |
| b34 | B6 | 16 | 1080 | 92 | 760 | 690 | 600 | 540 |
| b35 | B6 | 16 | 1080 | 92 | 760 | 690 | 630 | 580 |
| b36 | B6 | 16 | 1080 | 92 | 760 | 690 | 630 | 520 |

| | Metallographic structure | | | | Base metal properties | | | |
|---|---|---|---|---|---|---|---|---|
| Manufacturing condition No. | Average grain size of prior austenite grains (μm) | Average aspect ratio of prior austenite grains | Volume fraction of austenite phase (%) | Average effective grain size (μm) | Yield stress (MPa) | Tensile strength (MPa) | Extremely low temperature toughness* (MPa·√m) | Note |
| b15 | 4.2 | 3.3 | 1.5 | 3.7 | 577 | 670 | 97 | Comparative |
| b16 | 4.8 | 2.9 | 4.7 | 2.2 | 666 | 755 | 86 | Example |
| b17 | 4.7 | 3.3 | 4.5 | 2.1 | 680 | 768 | 75 | |
| b18 | 4.4 | 2.9 | 1.5 | 3.8 | 608 | 708 | 87 | |
| b19 | 4.5 | 3.0 | 4.2 | 2.5 | 624 | 715 | 85 | |
| b20 | 4.0 | 3.2 | 4.3 | 2.6 | 620 | 716 | 79 | |
| b21 | 4.3 | 3.1 | 4.5 | 2.7 | 615 | 720 | 102 | |
| b22 | 4.7 | 3.5 | 4.8 | 2.0 | 683 | 780 | 74 | |
| b23 | 4.8 | 2.5 | 4.4 | 4.1 | 570 | 659 | 118 | |
| b24 | 4.6 | 3.0 | 3.9 | 2.3 | 647 | 738 | 90 | |
| b25 | 4.9 | 10.1 | 3.8 | 2.9 | 605 | 701 | 83 | |
| b26 | 3.8 | 3.2 | 4.5 | 2.4 | 633 | 721 | 75 | |

TABLE 8-continued

| | | | | | | | |
|---|---|---|---|---|---|---|---|
| b27 | <u>8.6</u> | 2.7 | 3.7 | 5.5 | 664 | 750 | 74 |
| b28 | <u>7.3</u> | <u>2.5</u> | 3.8 | 4.5 | 662 | 746 | 96 |
| b29 | <u>6.7</u> | <u>2.5</u> | 3.4 | 4.9 | 662 | 747 | 83 |
| b30 | <u>6.3</u> | <u>10.6</u> | 3.6 | 3.9 | 632 | 725 | 90 |
| b31 | <u>6.1</u> | <u>10.2</u> | 3.8 | 3.6 | 640 | 735 | 92 |
| b32 | <u>6.4</u> | <u>11.0</u> | 3.8 | 5.2 | 622 | 719 | 87 |
| b33 | 5.0 | 3.2 | <u>1.9</u> | 3.1 | 598 | 702 | 90 |
| b34 | 4.8 | 3.3 | <u>1.8</u> | 3.2 | 681 | 779 | 90 |
| b35 | 5.2 | 3.2 | 4.2 | 3.0 | <u>720</u> | <u>819</u> | 70 |
| b36 | 5.2 | 3.2 | 3.8 | 3.0 | <u>716</u> | 804 | 72 |

Underline means outside the range of the present invention.
*Extremely low temperature toughness is the $K_fC$ value (converted from J value) in liquid hydrogen (−253° C.), the unit is MPa · √m.

As is apparent from Tables 7 and 8, in Manufacturing Nos. b1 to b14, the yield stress and tensile strength at room temperature, and the extremely low temperature toughness satisfied the target values.

Contrary to this, in Manufacturing No. b15 which is a comparative example, the C content was small, and the volume fraction of the austenite phase was small, so that the yield stress and tensile strength at room temperature and the extremely low temperature toughness had decreased. In Manufacturing No. b18, the Mn content was small, and the volume fraction of the austenite phase was small, so that the extremely low temperature toughness had decreased.

In each of Manufacturing Nos. b16, b17, b19 to b22, and b24, the C content, Si content, Mn content, P content, S content, Cr content, and Al content were large, so that the extremely low temperature toughness had decreased. In Manufacturing No. b23, the Mo content was small, so that the yield stress and tensile strength at room temperature had decreased and the extremely low temperature toughness had also decreased. In Manufacturing No. b25, the Nb content and the B content were large, and the aspect ratio of the prior austenite grains was large, so that the extremely low temperature toughness had decreased. In Manufacturing No. b26, the Ti content and the N content were large, so that the extremely low temperature toughness had decreased.

Manufacturing Nos. b27 to b36 are examples in which manufacturing conditions that deviated from preferable ranges are adopted. In Manufacturing No. b27, the heating temperature was high, so that the average grain size and average effective grain size of the prior austenite grains had increased and the extremely low temperature toughness had decreased. In Manufacturing No. b28, the cumulative rolling reduction at 950° C. or lower during the hot rolling was low, so that the average grain size of the prior austenite grains had increased, and the extremely low temperature toughness had decreased.

In Manufacturing No. b29, the rolling finishing temperature was high, so that the average grain size of the prior austenite grains had increased, the average effective grain size had increased, and the extremely low temperature toughness had decreased. In Manufacturing No. b30, the heating temperature and rolling finishing temperature were low, so that the average grain size and the average aspect ratio of the prior austenite grains had increased, and the extremely low temperature toughness had decreased.

In Manufacturing No. b31, the heating temperature was low, so that the average grain size and average aspect ratio of the prior austenite grains had increased, and the extremely low temperature toughness had decreased. In Manufacturing No. b32, the rolling finishing temperature was low, so that the average grain size and average aspect ratio of the prior austenite grains and the average effective grain size had increased, and the extremely low temperature toughness had decreased.

In Manufacturing No. b33, the intermediate heat treatment temperature was high, so that the volume fraction of the austenite phase was small, and the extremely low temperature toughness had decreased. In Manufacturing No. b34, the intermediate heat treatment temperature was low, so that the volume fraction of the austenite phase was small, and the extremely low temperature toughness had decreased.

In Manufacturing No. b35, the tempering temperature was high, so that the yield stress and tensile strength had increased, and the extremely low temperature toughness had decreased. In Manufacturing No. b36, the tempering temperature was low, so that the yield stress had increased, and the extremely low temperature toughness had decreased.

The invention claimed is:
1. A nickel-containing steel comprising, as a chemical composition, by mass %:
C: 0.040% to 0.080%;
Si: 0.03% to 0.30%;
Mn: 0.20% to 0.80%;
Ni: 10.5% to 12.4%;
Mo: 0.10% to 0.50%;
Al: 0.010% to 0.060%;
N: 0.0015% to 0.0060%;
O: 0.0007% to 0.0030%;
Cu: 0% to 0.50%;
Cr: 0% to 0.50%;
Nb: 0% to 0.020%;
V: 0% to 0.080%;
Ti: 0% to 0.020%;
B: 0% to 0.0020%;
Ca: 0% to 0.0040%;
REM: 0% to 0.0050%;
P: 0.0070% or less;
S: 0.0040% or less; and
a remainder: Fe and impurities,
wherein a metallographic structure of a thickness middle plane contains 2.0 vol % to 20.0 vol % of an austenite phase,
an average grain size of prior austenite grains, measured in accordance with JIS G 0551, measured in a section of the thickness middle plane parallel to a rolling direction and a thickness direction is 3.0 μm to 12.0 μm,
an average aspect ratio of the prior austenite grains, wherein the aspect ratio of the prior austenite grains is defined as: length of the prior austenite grains in a rolling direction/thickness of the prior austenite grains in the thickness direction, measured in the section of the thickness middle plane parallel to the rolling direction and the thickness direction is 2.6 to 10.0, a plate thickness is 16 mm to 20 mm,
a yield stress at room temperature, measured in accordance with JIS Z 2241, is 590 MPa to 710 MPa,
a tensile strength at the room temperature, measured in accordance with JIS Z 2241, is 690 MPa to 810 MPa,
when the plate thickness is more than 16 mm, the nickel-containing steel contains Ni: 11.5% or more.

2. The nickel-containing steel according to claim 1 comprising, as the chemical composition, by mass %:
Ni: 11.5% or more, and
Mn: 0.50% or less.

3. The nickel-containing steel according to claim 1 comprising, as the chemical composition, by mass %:
Ni: 11.5% or more, and
wherein the average grain size of the prior austenite grains, measured in accordance with JIS G 0051, is 9.0 µm or less.

4. The nickel-containing steel according to claim 1,
wherein an average effective grain size measured in the section of the thickness middle plane parallel to the rolling direction and the thickness direction is 2.0 µm to 7.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

5. The nickel-containing steel according to claim 1,
wherein an average effective grain size measured in the section of the thickness middle plane parallel to the rolling direction and the thickness direction is 2.0 µm to 4.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

6. The nickel-containing steel according to claim 2 comprising, as the chemical composition, by mass %:
Ni: 11.5% or more, and
wherein the average grain size of the prior austenite grains, measured in accordance with JIS G 0551, is 9.0 µm or less.

7. The nickel-containing steel according to claim 2,
wherein an average effective grain size measured in the section of the thickness middle plane parallel to the rolling direction and the thickness direction is 2.0 µm to 7.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

8. The nickel-containing steel according to claim 3,
wherein an average effective grain size measured in the section of the thickness middle plane parallel to the rolling direction and the thickness direction is 2.0 µm to 7.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

9. The nickel-containing steel according to claim 6,
wherein an average effective grain size measured in the section of the thickness middle plane parallel to the rolling direction and the thickness direction is 2.0 µm to 7.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

10. The nickel-containing steel according to claim 2,
wherein an average effective grain size measured in the section of the thickness middle plane parallel to the rolling direction and the thickness direction is 2.0 µm to 4.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

11. The nickel-containing steel according to claim 3,
wherein an average effective grain size measured in the section of the thickness middle plane parallel to the rolling direction and the thickness direction is 2.0 µm to 4.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

12. The nickel-containing steel according to claim 6,
wherein an average effective grain size measured in the section of the thickness middle plane parallel to the rolling direction and the thickness direction is 2.0 µm to 4.0 µm, and
wherein the average effective grain size is measured by taking a sample from the steel after tempering, and observing five or more visual fields at a magnification of 2,000-fold using an electron backscatter diffraction analyzer,
wherein an effective grain is defined as a grain surrounded by a grain boundary, and a grain boundary is defined as a boundary of a metallographic structure having an orientation difference of 15° or more, and
a circle equivalent grain size is obtained from multiple areas of effective grains by image processing, and an average value of an obtained circle equivalent grain sizes represents the average effective grain size.

* * * * *